(12) United States Patent
Doynov

(10) Patent No.: US 12,184,060 B1
(45) Date of Patent: Dec. 31, 2024

(54) METHODS AND SYSTEMS FOR USING SOLID STATE TRANSFORMERS TO PROTECT MEDIUM AND LOW VOLTAGE ELECTRICAL GRIDS FROM EXTREME EMP TRANSIENTS

(71) Applicant: EMP Shield Inc., Burlington, KS (US)

(72) Inventor: Plamen Doynov, Kansas City, MO (US)

(73) Assignee: EMP Shield Inc., Burlington, KS (US)

( * ) Notice: Subject to any disclaimer, the term of this patent is extended or adjusted under 35 U.S.C. 154(b) by 0 days.

(21) Appl. No.: 18/752,116

(22) Filed: Jun. 24, 2024

(51) Int. Cl.
| | | |
|---|---|---|
| *H02H 9/04* | (2006.01) | |
| *H02J 3/00* | (2006.01) | |
| *H02J 4/00* | (2006.01) | |

(52) U.S. Cl.
CPC ........... *H02H 9/04* (2013.01); *H02J 3/00125* (2020.01); *H02J 4/00* (2013.01)

(58) Field of Classification Search
CPC ........... H02H 9/04; H02J 3/00125; H02J 4/00
USPC ........................................................ 361/118
See application file for complete search history.

(56) References Cited

U.S. PATENT DOCUMENTS

| | | | | | |
|---|---|---|---|---|---|
| 6,975,494 | B2 * | 12/2005 | Tang | ........................ | G06F 1/26 323/272 |
| 9,413,221 | B1 * | 8/2016 | Kim | ...................... | H02M 7/217 |
| 9,490,720 | B1 * | 11/2016 | Kim | ...................... | H02M 5/293 |
| 10,537,046 | B1 * | 1/2020 | Ledezma | ........... | H05K 7/20936 |
| 2005/0111246 | A1 * | 5/2005 | Lai | ........................ | H02M 7/483 363/157 |
| 2006/0215339 | A1 * | 9/2006 | Camagna | ................ | H04L 12/10 361/90 |

(Continued)

FOREIGN PATENT DOCUMENTS

| | | | | | |
|---|---|---|---|---|---|
| CN | 101238635 | B | * | 6/2012 | ............ H02M 7/219 |
| CN | 104617580 | A | * | 5/2015 | ............... H02H 9/02 |

(Continued)

OTHER PUBLICATIONS

Luc Meysenc; Title; multilevel ac/dc converter for traction applications; entire specification (Year: 2008).*

*Primary Examiner* — Dharti H Patel
(74) *Attorney, Agent, or Firm* — Fresh IP PLC; John R. Bednarz

(57) ABSTRACT

A system suppresses extreme voltage surges induced on electric power lines due to transient electromagnetic energy disturbance from detonation of a nuclear weapon at high altitude generating an electromagnetic pulse (EMP) comprising E1, E2, and E3 pulses, geomagnetic disturbance, and intentional electromagnetic interference. Low voltage (LV) surge protection (SP) assemblies mounted at medium voltage (MV) inputs and LV outputs of the stacked converter cells of a solid-state transformer (SST) form SP of MV and LV electrical power grids interfaced by the SST. The SP assemblies utilize LV components to provide MV grid protection, shunting overcurrent to ground without interfering with the SST MV/LV grid segments isolation. The SP components are selected and coordinated to achieve predefined response at protection threshold voltage levels with current capacity mitigating complex components of HEMP. The hybrid SP communicates with SST control to react to a prolonged overvoltage/overcurrent fault condition.

21 Claims, 15 Drawing Sheets

(56) References Cited

U.S. PATENT DOCUMENTS

| | | | | |
|---|---|---|---|---|
| 2015/0365003 A1* | 12/2015 | Sadwick | ................ | H02M 3/28 |
| | | | | 363/21.01 |
| 2016/0336733 A1* | 11/2016 | Li | ........................... | H02M 1/34 |
| 2020/0006970 A1* | 1/2020 | Chen | ..................... | H02M 7/217 |
| 2023/0170686 A1* | 6/2023 | Kim | ..................... | H02H 1/0007 |
| | | | | 361/47 |
| 2024/0302031 A1* | 9/2024 | Archer | ................ | F21V 19/003 |

FOREIGN PATENT DOCUMENTS

| | | | | | |
|---|---|---|---|---|---|
| CN | | 117595344 A | * | 2/2024 | |
| WO | WO-2017201209 A1 | * | 11/2017 | ............... | H02J 3/18 |
| WO | WO-2018208991 A1 | * | 11/2018 | ............ | H01F 19/00 |
| WO | WO-2019213673 A1 | * | 11/2019 | ............ | H02M 1/007 |

\* cited by examiner

30 Early time HEMP (E1)

$E_1(t) = 0$ for $t \leq 0$
$E_1(t) = E_{01} \, k_1 \, [e^{a_1 t} - e^{b_1 t}]$ for $t > 0$
where $E_{01} = 50,000$ V/m,
$a_1 = 4 \times 10^7$ s$^{-1}$,
$b_1 = 6 \times 10^8$ s$^{-1}$, and
$k_1 = 1.3$

31 Intermediate time HEMP (E2)

$E_2(t) = 0$ for $t \leq 0$
$E_2(t) = E_{02} \, k_1 \, [e^{a_2 t} - e^{b_2 t}]$ for $t > 0$
where $E_{02} = 100$ V/m,
$a_2 = 1 \times 10^3$ s$^{-1}$,
$b_2 = 6 \times 10^8$ s$^{-1}$, and
$k_2 = 1.0$

32 Late time HEMP (E3)

$E3(t) = E_i(t) + E_j(t)$ $E_i(t) = 0$ for $\tau \leq 0$
$E_i(t) = E_{0i} \, k_1 \, [e^{a_i \tau} - e^{b_i \tau}]$ for $\tau > 0$
where $\tau = t - 1$, $E_{0i} = 0.04$ V/m,
$a_i = 0.02$ s$^{-1}$, $b_i = 2$ s$^{-1}$, and
$k_i = 1.058$ $E_j(t) = 0$ for $\tau \leq 0$
$E_j(t) = E_{0j} \, k_1 \, [e^{a_j \tau} - e^{b_j \tau}]$ for $\tau > 0$
where $\tau = t - 1$, $E_{0j} = 0.01326$ V/m,
$a_j = 0.015$ s$^{-1}$, $b_j = 0.02$ s$^{-1}$, and
$k_j = 9.481$

35

| Standard Parameter | Bell Labs (1960s) DEXP | IEC-77C (1993) DEXP | Leuthauser (1994) QEXP | VG95371-10 (1995) DEXP | IEC 61000-2-9 (1996) DEXP |
|---|---|---|---|---|---|
| t10%-90% | 4.6 ns | 2.5 ns | 1.9 ns | 0.9 ns | 2.5 ns |
| Peak Field $E_0$ | 50 kV/m | 50 kV/m | 60 kV/m | 65 kV/m | 50 kV/m |
| FWHM | 18.4 ns | 23 ns | 23.8 ns | 24.1 ns | 23 ns |
| constant | 1.05 | 1.3 | 1.08 | 1.085 | 1.3 |
| α (1/sec) | 4×10$^6$ | 4×10$^7$ | 2.20×10$^9$ | 3.22×10$^7$ | 4×10$^7$ |
| β (1/sec) | 4.76×10$^8$ | 6×10$^8$ | 3.24×10$^7$ | 2.07×10$^9$ | 6×10$^8$ |
| Energy Density | 0.891 J/m$^2$ | 0.114 J/m$^2$ | 0.167 J/m$^2$ | 0.196 J/m$^2$ | 0.114 J/m$^2$ |

| Waveform parameter | First return stroke | Subsequent strokes |
|---|---|---|
| Average 10%-90% rise time | 14.5 μs | 17.4 μs |
| Average 10%-10% duration time | 244.6 μs | 83.2 μs |
| Average maximum voltage gradient | 0.55 kV/μs | 0.35 kV/μs |
| Average 10%-90% rise time of first peak | 6.9 μs | 5.0 μs |
| Average interval between first and maximum peak | 11.2 μs | 14.6 μs |

FIG. 6

METHODS AND SYSTEMS FOR USING SOLID STATE TRANSFORMERS TO PROTECT MEDIUM AND LOW VOLTAGE ELECTRICAL GRIDS FROM EXTREME EMP TRANSIENTS

FIELD

The methods and systems relate to mitigating impending effects of extreme transient electromagnetic energy surges on medium and low voltage electrical power distribution systems and protecting electrical grid infrastructure from damage.

BACKGROUND

Extreme electromagnetic energy (EM) surges are events with high-magnitude over-voltages and currents exceeding the normal operational range of electrical and electronic devices connected to an electrical distribution network. They may occur randomly and usually for a short time interval. Powerful surges are associated with electrical grid circuit switching, electrostatic discharge (ESD), intentional electromagnetic interference (EMI), nuclear electromagnetic pulses (NEMP), non-nuclear EMP based on high-power electromagnetic (HPEM) sources, narrow, wide, and ultra-wide band frequency content from directed energy weapons (DEW) sources, and high-intensity radiofrequency (HIRF) sources used for jamming. Naturally occurring lightning strikes, geo-magnetic disturbance (GMD), and other natural phenomenon also produce high magnitude induced currents. There are multiple transients associated with the operation of the electrical power distribution grid itself due to the increased complexity of monitoring and dynamic control to assure stability and reliability. The sources of electromagnetic surges are summarized in FIG. 1. The sources based on natural phenomena or technology-based sources from operational dynamics and from intentional EMI (IEMI) can impose devastating effects on electrical and electronic infrastructure. To prevent or minimize the damage due to radiated and directly injected electromagnetic disturbance, proper design and installation of protecting and grounding systems is essential to suppress the hazardous effect of a surge, absorb the energy, and/or redirect the energy to ground.

The term electromagnetic pulse (EMP) is used to describe a transient burst of electromagnetic (EM) energy and the associated electromagnetic disturbances due to energy coupling to conductive surfaces and lines. As an example, the term "EMP" is used to describe the electromagnetic fields generated by natural or manmade sources. The terms High-altitude Nuclear EMP (HNEMP or HEMP) are used and refer to the electromagnetic pulse generated by a nuclear bomb detonation at a high altitude in the Earth's atmosphere and resulting in a very large scale, high magnitude, and broadband EMP described with three main components called E1, E2, and E3.

The first component E1 (early time) is specified by the mechanism called magneto-bremsstrahlung. It is produced by the acceleration of gamma ray generated Compton electrons in the geomagnetic field. The geomagnetic field deflects the initial electron trajectories and radiates an electromagnetic signal in a narrow space angle along the original electron velocity direction. The second part of the HEMP (intermediate time E2) is defined by the mechanism associated with the presence of the atmospheric density gradient. This produces a dependence of the electron current distribution on the polar angle as well as a non-compensated vertical current radiating a so-called TM-wave (transverse magnetic waves), characterized by the fact that the magnetic vector (H vector) is always perpendicular to the direction of propagation.

The physics of the late-time HEMP E3 or magnetohydrodynamic EMP (MHD EMP) differs substantially from E1 and E2 due to its formation as interaction between the disturbed region of the burst and the geomagnetic field. The electrical current systems arising during the motion of the ionized medium lead to an entire or partial pushing of the geomagnetic field out of the boundaries of the burst perturbed region. The range of this geomagnetic effect and, hence, the intensity of the MHD EMP generation are defined by the extent of the gas-dynamic and ionized perturbation of the atmosphere following the nuclear burst.

Solar corona Mass Ejection (CME), supernova explosion, and other cosmic phenomenon result in Geomagnetic Disturbance (GMD) and large-scale EM disturbance effects and geomagnetically induced current (GIS). Natural lightning strikes generate localized EMPs which have characteristics comparable to the E2 of HEMP but comprise many strikes and may have higher field intensity based on the proximity to an electrical network.

Several specific parameters correlate the waveform to the intensity and spectral content of the EMP. In the time domain, the EMP is presented with a waveform that describes how the amplitude of the pulse changes in time. The EM energy pulses tend to vary and to be quite complex, so their simplified model descriptions are typically characterized by:

- The type of EM energy-radiated EM (direction of propagation, polarization, etc.) coupling, directly injected, conducted, electric, magnetic, etc.
- Pulse representation in time domain defined with its waveform rise and fall time, pulse width at half maximum (PWHM), duration, peak amplitude, repetition rate, polarity, and others.
- Frequency content and power spectrum distribution (in frequency domain) related to the time domain waveform characteristics.

Analytical expressions and mathematical transformations exist to describe the EMP in time, frequency, and joint time-frequency domains. These interdependent characteristics define a range of impending coupling dependencies and level of damaging effects of excessive transient electromagnetic energy. The extreme electromagnetic (EM) energy couples to the long length transmission and distribution electric power lines and may cause severe damaging effects on the electrical grid infrastructure. The increased complexity of the modern "smart" grid makes it even more vulnerable to high energy EM surges based on natural phenomena and technology-based sources.

The types of electrical voltage refer to the types of electrical circuits that run on a power line. High voltage lines are those above 36 kV, according to the International Electrotechnical Commission (IEC). High-voltage electrical installations are used to transport electricity over long distances from generation centers to transformer substations. Medium voltage lines are networks with a voltage between 1 kV and 36 kV. It is obtained at electrical substations, where electricity is transformed from high voltage to medium voltage. Currently, the interfacing between the different voltage levels in the electrical grid is based on Low-Frequency Transformers (LFTs).

While the technology of LFT has improved significantly, this critical component of the grid remains vulnerable to EMP especially to geomagnetic induced quasi-DC currents. In addition, the need to integrate renewable energy sources' mini grids with the LV alternating current (AC) or direct current (DC) grids and the progress of the semiconductor technology has led to the idea of Solid-State Transformers (SSTs), where the power conversion is realized with a medium-frequency link. SSTs are aimed to interface the MV AC grid with LV AC or DC grids. SSTs achieve a high efficiency conversion from AC to DC, while allowing power flow control, active filtering, reactive power compensation, and more beneficial functions. Different topologies are developed for SSTs featuring unidirectional or bidirectional energy conversion, using single or multi-cell converter types. The design topologies of SSTs, the suitable components, and the operation in a grid deployment have been examined in detail and are undergoing continuous improvements and optimizations.

SUMMARY

The methods and systems described in this application utilize the topologies of the SSTs and their inherent characteristics to provide protection against the hazardous effects of extreme EM energy surges and extend the EMP protection to medium voltage lines. Using currently available components, methods are presented for systems that respond instantaneously to overvoltage and overcurrent to clamp, absorb, shunt, and therefore limit the excessive energy coupled to medium and low voltage (ML and LV) electric power transmission lines and infrastructure and protect the connected electrical and electronic systems from damage. In doing so, the methods and systems enhance persistent protection, critical infrastructure resilience, and operational reliability.

In brief, this disclosure describes, among other things, methods and systems for enhanced protection of electrical and electronic systems from electromagnetic pulse-induced electrical transient surges induced by the E1, E2, and E3 components of an electromagnetic radiation complex high-altitude EMP (HEMP), generated by the detonation of a nuclear weapon at high altitude in the atmosphere, intentional electromagnetic interference (IEMI), natural lightning strikes, a Geo-magnetic disturbance (GMD) produced by a coronal mass ejection (CME), or other transient surges due to radiated and conducted electromagnetic interference (EMI).

The definition of surge in the U.S. English dictionary is "a sudden large increase in something that has previously been steady or has only increased or developed slowly." As an intransitive verb, "something surges, it increases suddenly and greatly, after being steady or developing only slowly." Transient is used to describe "a situation that lasts only a short time, not permanent, temporary, passing away with time." In one aspect, the methods and systems for protection from extreme transient electromagnetic surges are cognizant that modern protecting devices are designed and built with components for limiting, absorbing, switching, and shunting excessive electromagnetic energy. The surge protection devices (SPDs) must react instantaneously to abrupt over voltages and currents induced in electric power lines by different electromagnetic sources. Protection from the hazardous effect of the high altitude nuclear EMP is especially challenging due to its magnitude and broadband frequencies.

The SPDs are described as Types by Underwriters Laboratories (UL) and as Categories by the Institute of Electrical and Electronics engineers (IEEE) depending on their intended installation allocation. The components used for SPDs have different parameters and functional characteristics to provide solutions to the broad range of pluralities of EMPs from natural and technology-based sources as listed in FIG. 1. They comprise limiting, absorbing, switching, and shunting assemblies including transient voltage suppressors (TVSs), metal oxide varistors (MOVs), gas discharge tubes (GDTs), glass GDTs, avalanche diodes (ADs), avalanche transistors (ATs), spark gap protectors (SPG) and thyristor surge suppressors (TSS), solid state switches, other solid state and nonlinear components based on semiconductors (i.e., Si, Ge), ultra-wideband compound semiconductors (i.e., SiC, GaN, GaAs), mechanical, electrical, and ionization discharge devices (IDDs) as bulk components, distributed metamaterials, and combinations thereof.

Many SPDs are developed for low voltage electric power distribution lines. SPDs are commercially available with characteristics scaled with the electrical network application. In one aspect, the specifications and requirements for surge protection devices (SPD) are well defined for low voltage (LV) electric power lines (1 kV and less). For example, the Maximum Continuous Operating Voltage (MCOV) is usually specified not to be less than 115%-120% of the nominal system operating voltage. Many technologies and components listed above have been developed for applications in low voltage AC and DC power lines. The components for medium voltage (MV) power lines do exist and respectively are large and expensive. Currently used surge arrestors installed on MV power lines address surges from lightning strikes, switching power equipment, line shorting, load rejection, and other operational failures. This disclosure describes, among other things, methods and systems for enhanced protection of MV and LV electric power distribution grids utilizing the modular topologies of solid-state transformers (SSTs).

In another aspect, the methods and systems for status monitoring of transient electromagnetic SPDs recognize that the devices used for clamping, limiting, absorbing, switching, and shunting are designed to withstand high magnitude voltage and current transients without interfering with the normal operation of the protected electrical networks. The disclosure notes that to address the complexity of EM energy coupling to different components of infrastructure, different categories of transient protection devices are used in combinations to form a hybrid approach to EMP protection. The allowable voltage amplitude levels of the protecting assemblies are selected and combined to achieve a predefined desired response time and protection level capacity to react to and mitigate the E1, E2, and E3 components of a complex multi-phase EMP generated by detonation of a nuclear weapon at high altitude producing a nuclear high altitude EMP (NHEMP).

The methods and systems are cognizant to the similarity of waveforms in time domain and their frequency spectrum associated with different EMP sources and address their differences. In a similar aspect, the response time and the voltage limiting and energy handling capacity of the plurality of inline embedded protecting assemblies respond to electromagnetic energy surges induced by intentional EMI, natural lightning strikes, Geo-magnetic disturbance (GMD) from solar corona mass ejection (CME) and comparable to HEMP E3 magneto-hydrodynamic electromagnetic pulse (MHD-EMP), or other EMI events.

In another aspect, the methods and systems of this disclosure provide a solution to the persistent protection readiness status of installed SPDs which is essential for providing continuous resilience to natural and technology-based surges. The methods address design consideration to improve the performance of the SPDs as system of systems (SoS) comprising utilization of components which complement their individual performance characteristics forming a staged hybrid system of subassemblies without mutual interference. The transient surge suppressing assemblies comprise coordinated characteristics to form a surge protecting device providing advanced protection with enhanced capabilities for instantaneous response and higher energy ratings, and the ability to handle larger and more severe power surges.

The methods and systems comprise implementations based on rapidly evolving development and deployment of solid-state transformers (SSTs), which allow use of currently available components for low voltage (LV) surge protection devices (SPDs) to be integrated into the modular topologies of SSTs and provide transient overvoltage protection in medium voltage electrical grids. SSTs are a viable alternative to line frequency transformers (LFTs) for interfacing distribution grid with different voltage levels and providing isolation between the grid segments. Although both isolation and insulation terms are often used interchangeably, isolation refers to the separation between two systems (e.g., voltage levels), while insulation refers to the actual medium being used to do the separation (e.g., SST).

A solid-state transformer (SST) uses a medium or high frequency transformer with power wide-bandgap semiconductors connected in such a way that the SST replicates the functionality of LFT while also providing value-added features. The inherent characteristics of SST implementation include continuous monitoring of operational status and functional parameters adjustment based on advanced hardware and embedded software platforms that may be enhanced with EMP surge protection of MV and LV electrical grids. Utilizing SSTs with embedded modular surge protection is a viable solution for providing a timely and adequate response to transient with more complex waveform characteristics, without interference of the normal electrical infrastructure operations, and continuity of operations without any disturbance or a minimal disturbance.

In a further aspect, the presented methods and systems provide surge protection of MV and LV AC and DC distribution power grids without impacting the operational characteristics of SSTs. The disclosed methods and systems provide instant surge protection response to magnitude and time duration of electromagnetic transients including the complex HEMP.

These and other aspects, features, and benefits of the present disclosure will become apparent from the following detailed written description of the preferred embodiments and aspects taken in conjunction with the following drawings, although variations and modifications thereto may be affected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 5 displays summary groups of the commonly used analytical expressions for the HEMP E1, E2, and E3 waveforms with the model parameter values and a table capturing the evolution of waveform models and standards describing the HEMP E1 environment, according to an example of the instant disclosure.

FIG. 6 presents a table of lightning strikes waveform average characteristics according to an example of the instant disclosure.

DETAILED DESCRIPTION

Figure 1:
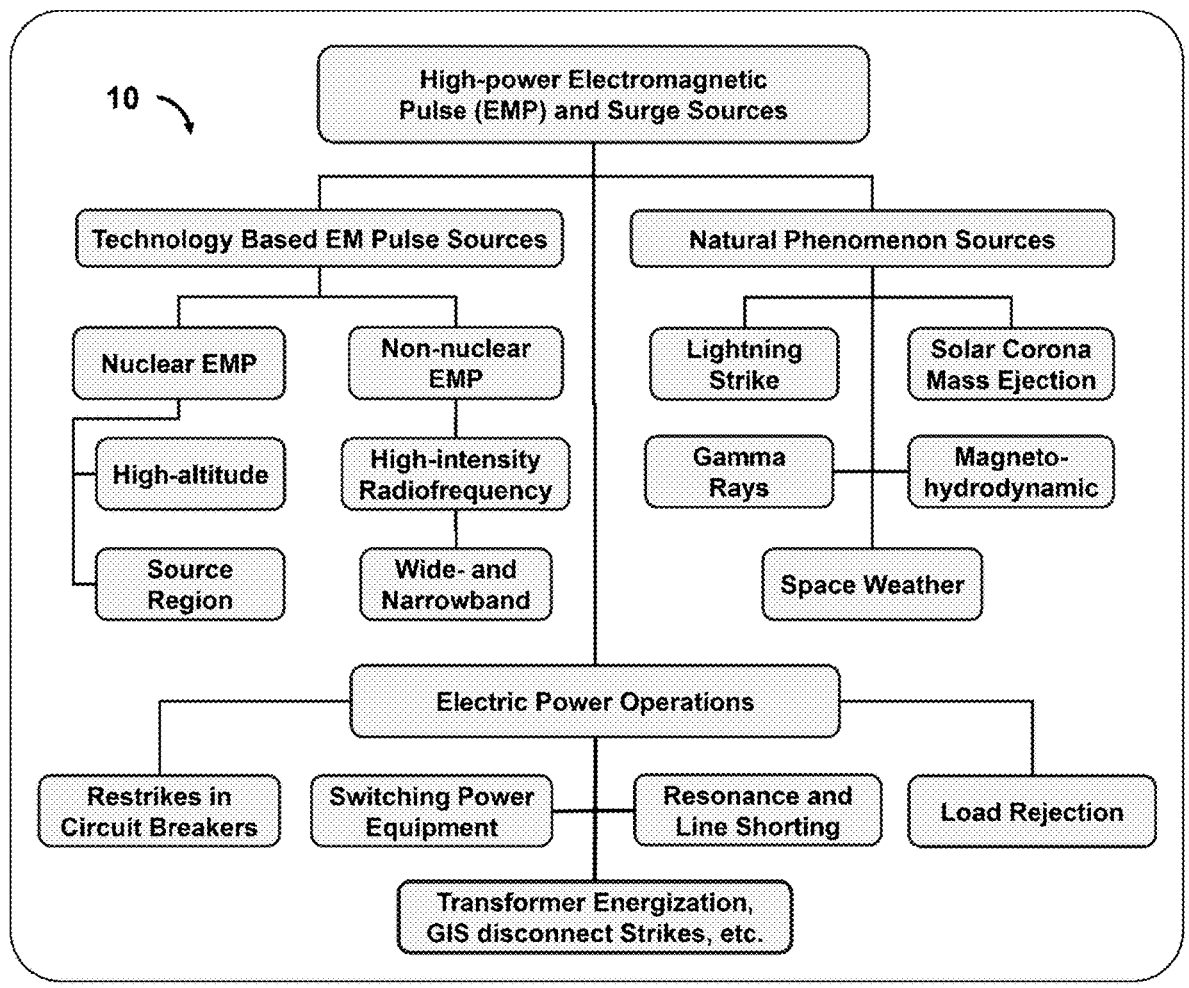
FIG. 1 displays a block diagram of the sources of transient electromagnetic surges, referred to as electromagnetic pulse (EMP), such as technology-based sources, naturally occurring phenomena, and surges associated with the electrical grid operations, according to an example of the instant disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may affect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways and does not require any of the specific features described herein. Also, well-known functions or constructions are not described in detail since they would obscure the invention with unnecessary detail. Any signal arrows in the drawings/figures and labeled components should be considered only as exemplary, and not limiting or exhaustive, unless otherwise specifically noted. Further, the description is not to be taken in a limiting sense but is made merely for the purpose of illustrating the general principles of the invention, since the scope of the invention is best defined by the appended claims.

It will be understood that, although the terms "first," "second," etc., as well as "primary", "secondary," etc., may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise.

It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted. In some alternative implementations, the functions/acts noted may occur out of the order noted in the figures. For example, two figures shown in succession may in fact be executed substantially concurrently or may sometimes be executed in the reverse order, depending upon the functionality/acts involved.

It should also be noted that the terms surge suppression and surge protection are often used interchangeably. However, there are key differences between the two. Surge suppressors offer basic protection against power surges, limiting excess voltage and diverting overcurrent to protect and extend the lifespan of electrical and electronic devices. Surge protectors provide advanced protection with higher Joule ratings, enhanced capabilities, and the ability to handle larger and more severe power surges. They offer expanded coverage and additional features. In this article, we will explore the concepts of surge suppressors and surge protectors, with the understanding that combinations of surge suppressing components form transient surge suppressing assemblies (TSSAs). Combined utilization of TSSAs with complimentary and coordinated characteristics are used to form a surge protection device (SPD) with expanded capacity and additional functionalities. It should be noted that properly connected multiple SPDs can be used to achieve protection with high-voltage and high-current capacity.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The characteristics of an electromagnetic pulse (EMP), in general, and high-altitude nuclear EMP (HNEMP), in particular, depend on the source and must be considered in the context of traditional electrical environments and setups before being described in detail and in regard to protection of electrical and electronic systems. Electromagnetic energy (EM) surges are phenomena where over-voltages and currents exceeding the normal operational range occur for a short period of time. To prevent or minimize the damage due to electromagnetic disturbance, proper design and installation of an EMI protection and grounding system is essential to suppress the hazardous effect of a surge, absorb the energy, and/or redirect the energy to ground. FIGS. 1 to 10 are included to supplement the description of the physical phenomena that result in the extreme intensity of natural sources and high altitude EMP and its broadband frequency content, as shown in the figures and tables. It is shown that part of a nuclear high altitude EMP (HEMP E2) resembles the characteristics of frequently occurring natural lightning strikes, and others are reminiscent to Geo-magnetic disturbance (GMD) events. The man-made directed energy sources for intentional EMI have capabilities to generate more complex waveforms in time domain and variations of spectral content and distribution that must be accounted during the design and implementation of SPDs.

Currently, there are several main approaches to SST topology design:
- SST topology with multiple identical modules in series at the MV stage of the SST. Every module consists of a power electronic converter from $V_{MV}/N$ to LV, where $V_{MV}$ is the nominal voltage of the MV grid segment and N is the number of SST modules. This enables the use of low voltage power semiconductors.
- SST utilizing electronic converter (or converters) utilizing composite switches rated at full $V_{MV}$.
- SST utilizing a multiport transformer with multiple parallel windings on one side and multiple switching modules each connected to a separate transformer winding.
- SST comprising multiple high frequency converter modules with outputs connected to a single transformer primary winding with voltage-blocking capacitors.

The modular topology SSTs provide the opportunity to implement surge protection at the MV stage of the SST utilizing low voltage components for the design implementation of surge protection systems.

The block-diagram 10 in FIG. 1 presents example sources of transient electromagnetic surges, referred to as electromagnetic pulse (EMP), grouped as technology-based sources, naturally occurring phenomena, and surges associated with the electrical grid operations, according to an example of the instant disclosure.

Figure 2:
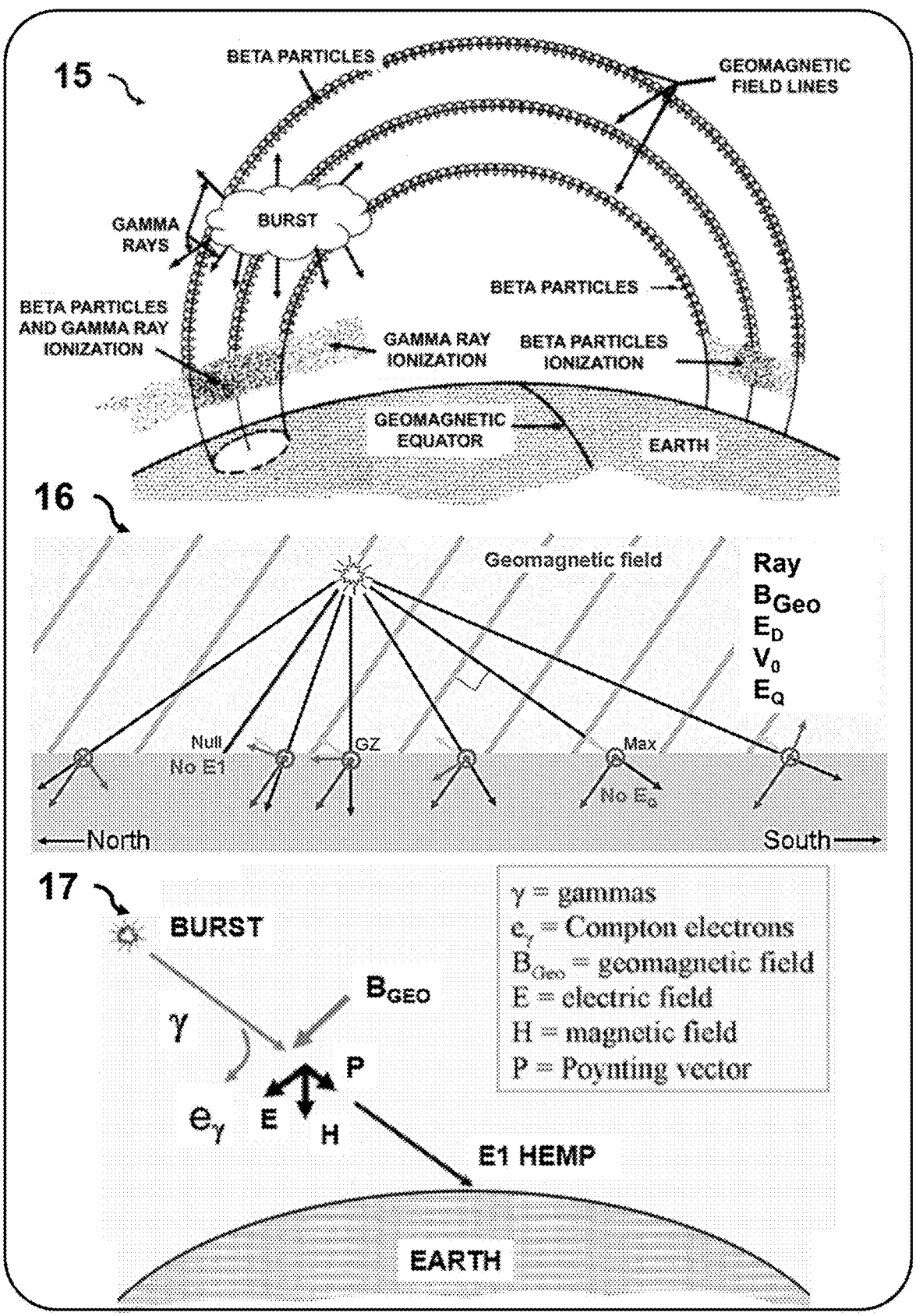
FIG. 2 displays pictographs of a nuclear burst high-altitude electromagnetic pulse formation, according to an example of the instant disclosure.

The pictograph 15 in FIG. 2 shows an electromagnetic pulse formation generated by a nuclear explosion in the atmosphere at high altitude and the electromagnetic pulse (EMP) formation due to the interactions of gamma rays and beta particles with the Geomagnetic field, the generation of the Compton electrons. The current understanding of high-altitude nuclear EMP is based on the interactions of the blast-generated high-energy gamma rays with atoms in the atmosphere that produce electrons which interact with the Geo-magnetic field producing an EM field with a Poynting vector from the burst source towards the Earth's surface. Pictograph 16 illustrates the dependence of EMP on the geolocation with respect to the burst location and Geomagnetic field lines. The electric E and magnetic H components of the electro-magnetic field (EMF) Poynting vector direction with respect to the observer's location on the Earth's surface is illustrated with pictograph 17, according to an example of the instant disclosure.

Figure 3:
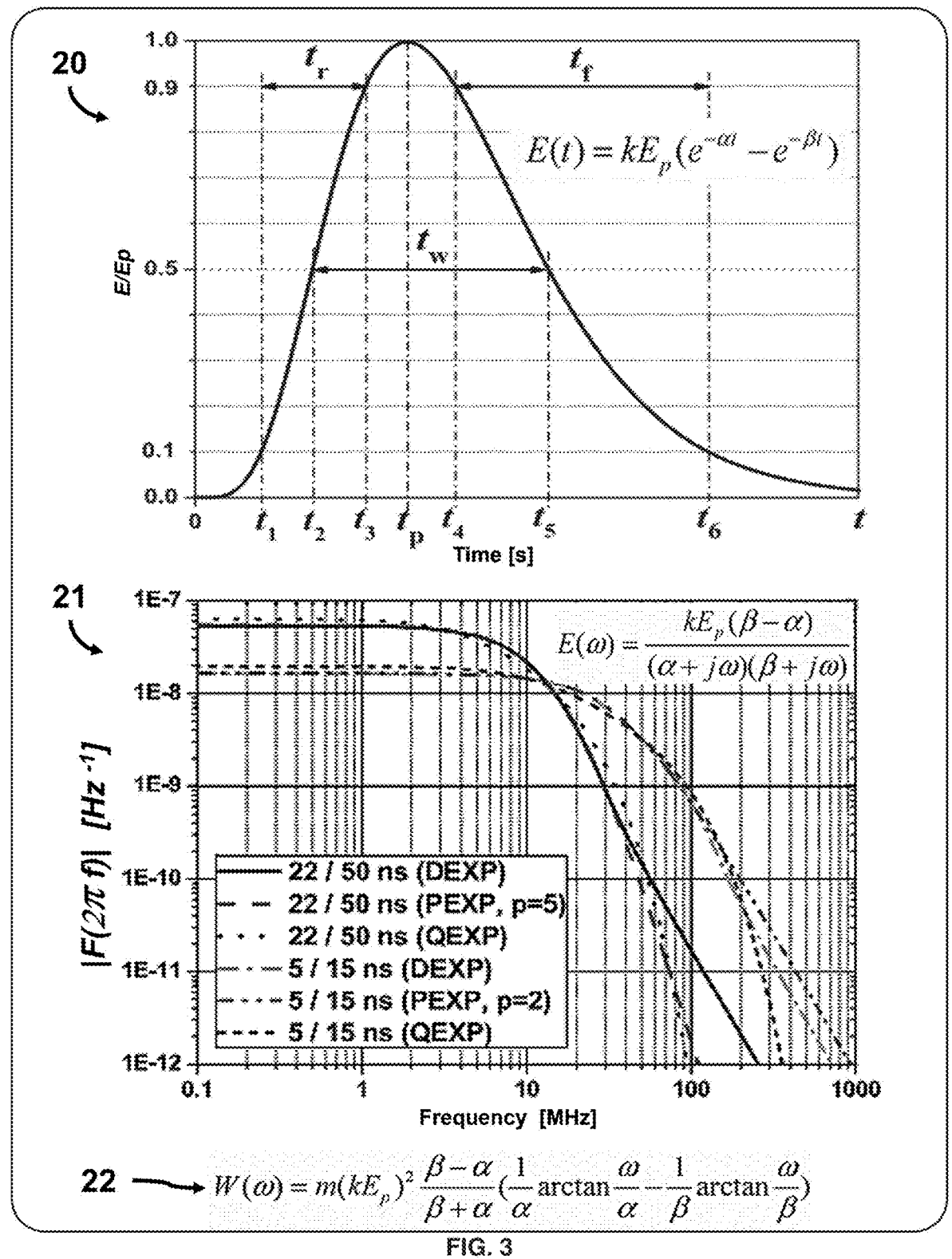
FIG. 3 displays plots of generalized double-exponential waveform in time domain and the spectral distribution dependency on the characteristics of the pulse waveform, according to an example of the instant disclosure.

Looking to FIG. 3, plot 20 displays generalized double-exponential waveform in time domain. The popular double exponential function is shown with its analytical expression. The Ep is the peak value of the function, k is a modifying factor to make E/Ep=1, $\alpha$ and $\beta$ are characteristic parameters. To keep the double exponential function pulse with positive polarity, the parameters $\alpha$ and $\beta$ should satisfy the condition that $\beta>\alpha>0$, $t\geq0$. The rise time of the pulse $t_r$ is defined from 10% to 90% of the pulse amplitude and correlates to the spectral content of the pulse which can be obtained using the Fourier transform given in the upper right corner of plot 21. The spectral distribution dependency on the characteristics of the pulse waveforms with different characteristics are displayed with superimposed plots in 21 of FIG. 3. The respected rise time and pulse width at half amplitude are also given for several different waveform models. To estimate the distribution of the EMP described with double exponential function (DEXP), the normalized energy spectrum of DEXP can be used to get the magnitude spectrum and the power spectrum from the Parseval's theorem and the integral for power spectrum to calculate the energy spectrum W (w) form as shown with analytical expression 22 in FIG. 3. The different HEMP E1 waveform models are shown to illustrate that the high frequency energy that needs to be mitigated varies and the importance of model parameters are explored further below, according to an example of the instant disclosure.

The field generated by a high-altitude EMP (HEMP) has direction variation along a north-south central line and over the horizon extended effects. The intensity of the pulse varies by location (latitude) due to the Geo-magnetic field distribution. Some additional relevant factors will be discussed further while the detailed specifics of the related physical phenomena are beyond the scope of this application.

Figure 4:
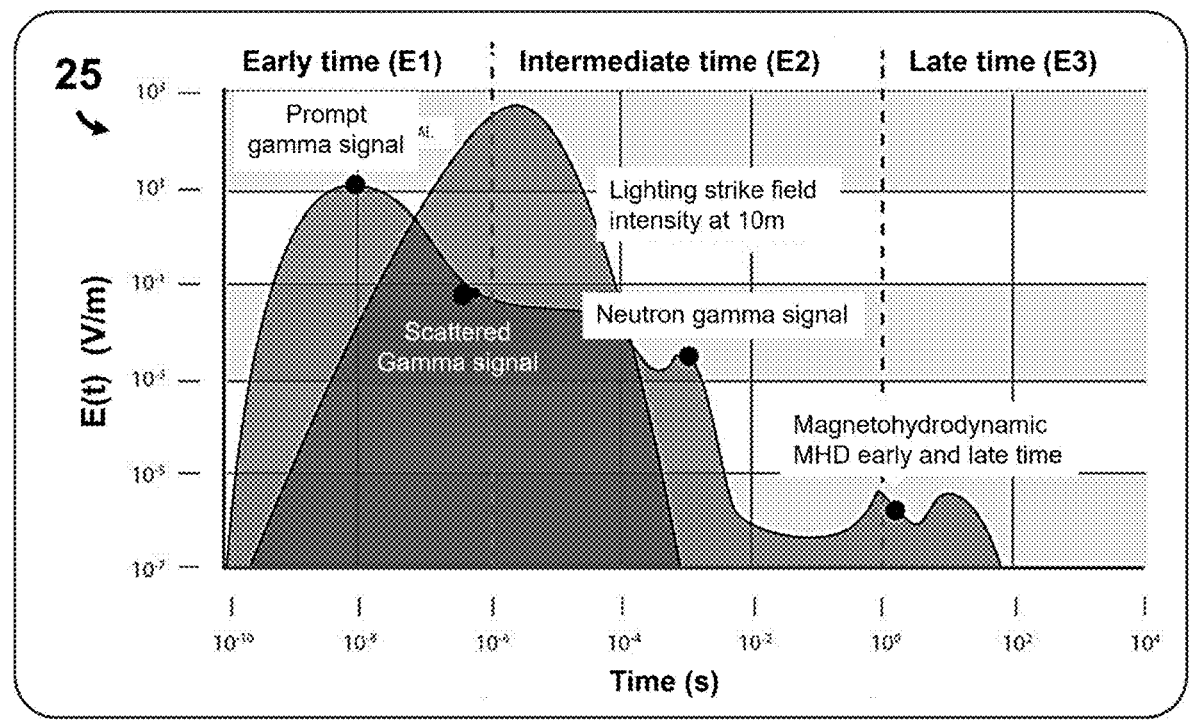
FIG. 4 presents a plot of the complex high-altitude electromagnetic event presented in time domain as a multi-pulse with a sequence of three E1, E2, and E3 phases (Early, Intermediate, and Late time periods) of the HEMP and the superimposed plot of EM field intensity of a lightning strike, according to an example of the instant disclosure.

Unlike the electromagnetic radiation or transient pulses associated with common natural phenomena (lighting strikes, transmission lines overvoltage, and overcurrent surges, etc.), the HEMP comprises of more complex time and frequency domain characteristics. The HEMP is described with several stages in time following the nuclear blast, usually referred to as Early, Intermediate, and Late time. They are also known as HEMP phases or pulses of varying waveform (magnitude, duration, frequency content, etc.) illustrated with plot 25 in FIG. 4. Therefore, the HEMP is more accurately considered as a complex, electromagnetic multi-pulse event, usually described in terms of sequence of three primary components defined by the International Electrotechnical Commission (IEC) as E1, E2, and E3 phases of the high-altitude EMP (HEMP). The characteristics of these phases (pulses) of HEMP are further described in this application. FIG. 4 presents a plot of the complex high-altitude electromagnetic event presented in time domain as a multi-pulse with a sequence of three E1, E2, and E3 phases (Early, Intermediate, and Late time periods) of the HEMP and the superimposed plot of EM field intensity of a lightning strike. The relative electric field strength of the time sequence is displayed in plot 25 in FIG. 4 using a logarithmic scale for the electric field strength E (V/m) vs Time(s), according to an example of the instant disclosure.

Looking to FIG. 5, summary groups of the commonly used analytical expressions for the HEMP E1, E2, and E3 waveforms with the model parameter values and a table capturing the evolution of waveform models and standards describing the HEMP E1 environment are given in FIG. 5 with groups 30, 31 and 32, respectively. The accepted values for the variables and coefficients in the analytical expressions are also given, according to an example of the instant disclosure. Starting in the 1960s, multiple waveform models have been developed to establish standards for testing the effects and the associated hazardous effects. The series of standards related to the description of the associated waveforms are known as IEC 77C Standards. The evolution of the unclassified standards of HEMP E1 environment can be seen in the Table 35 in FIG. 5, which displays the evolution of the waveform parameters of the unclassified HEMP E1 environment Standards, according to an example of the instant disclosure.

Looking to FIG. 6, Table 40 presents some additional details of the electromagnetic pulse waveform characteristics associated with lightning strikes. Lightning strikes are common physical phenomena in nature and are one of the main causes of electric power apparatus failure as well as power interruptions. To assess the susceptibility, level of effects and damages of electric power equipment, standard lightning impulse, with the wave front/tail time of 1.2/50 µs is recommended by the IEC Standard and used in the impulse voltage withstand tests. However, the standard lightning impulse waveform is a statistic result obtained on the transmission lines or towers for triggering lightning, which only can be regarded as a certain kind of lightning impulse waveform. As a side note, the visually perceived lightning strike is a sequence of current discharges. More than 90% of the lightning strikes in nature have a negative polarity. The intensity of the induced transient surges is dependent on the distance of the lightning strike from the transmission lines and the highest possible field intensity must be considered, according to an example of the instant disclosure.

To better analyze the waveform characteristics of induced voltages on the overhead transmission lines by natural lightning, the standard voltage waveforms are in terms of rising time, maximum voltage gradient, and the 10% to 90% rise time to peak value, overall duration time, etc. and some published results are summarized in Table 40 in FIG. 6 for a reference and comparison with the HEMP E2 characteristics. As seen in FIG. 6, the average 10%-90% first peak time for the induced voltage waveform of first return strokes is 6.9 µs, and the interval between first peak and maximum peak is 11.2 µs of the first return stroke. The average duration time of the induced voltage waveform of the first return strokes is 244.6 µs (from 10% rise time to 10% of peak value on the fall time), and that of the subsequent return strokes is 83.2 µs. The average 10%-90% rising time of the induced voltage waveform of the first return strokes is 14.5 µs, and its counterpart for subsequent return strokes is 17.4 µs, and induced voltages of the first return stroke are bigger than that of the subsequent ones and, therefore, the average maximum voltage gradient are respectively (0.55 kV/µs) larger than that of the latter (0.35 kV/µs).

An EMP event can induce voltages and corresponding currents into multiple and different electrical systems. The voltage/current magnitudes depend on the coupling of the EM field with the system (its susceptibility) and the characteristics of the EM wave (direction, polarization, frequency content, and others). EM energy couples to the long and exposed transmission lines of wide-area power distribution grids, as well as the electrical network systems of localized mini-grids of backup power supplies, renewable energy farm systems for generation, storage and grid connection, electrical vehicle charging stations, and others.

Without proper protection measures, over-voltage surges can disturb, damage, or destroy components within the electrical systems in the area of impact, diminishing the operability of the electrical system or rendering the electrical system unusable until repaired. Persistent and successful protection is possible only with implementation of adequate surge shielding (e.g., Faraday cage) and/or methods for surge limiting and energy redirection and absorbing. For example, multiple methods and tools are developed and used for surge protection from EM energy associated with lightning. While the duration of a lightning strike appears very short (microseconds, µs, or $10^{-6}$ s), it is orders of magnitude longer than the duration of what is known in the literature as the E1 HEMP, which is order of nanoseconds, (ns, or $10^{-9}$ s). As shown in FIG. 2, due to its origin, a HEMP will induce effects in a very large area. Similarly, it is understood that a massive solar corona mass ejection (CME) reaching the Earth results in Geomagnetic disturbance (GMD) generating extremely low frequency induces currents with damaging effects on electrical infrastructure.

Figure 7:
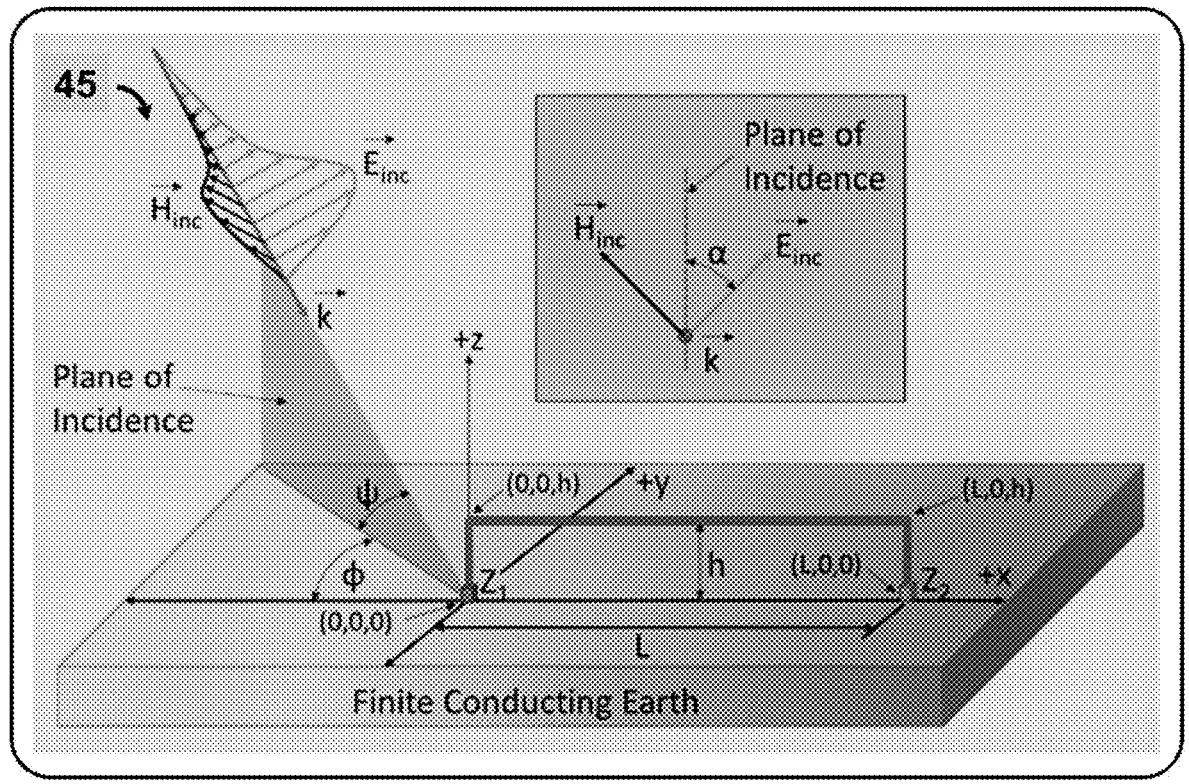
FIG. 7 illustrates the EM wave and its E (electric) and H (magnetic) vectors in the plane of incidence at an electric transmission line wire segment at height h above the ground surface and the three associated angles ($\alpha$, $\phi$, and $\psi$) indicative for the importance of the infrastructure configuration with respect to Electromagnetic field (EMF) susceptibility, according to an example of the instant disclosure.

Looking to FIG. 7, pictograph 45 illustrates the EM wave and its E (electric) and H (magnetic) vectors in the plane of incidence is shown at an electric transmission line wire segment at height h above the ground surface and the three associated angles $\alpha$, $\phi$, and $\psi$, indicative for the importance of the infrastructure configuration with respect to Electromagnetic field (EMF) susceptibility. Pictograph 45 is a simplified example of the coupling mechanism of the EMF to a transmission line wire and illustrates the complexity and multivariable components of coupling and overvoltage surge induction, according to an example of the instant disclosure. Pictograph 45 in FIG. 4 illustrates the coupling of the EM energy into a transmission line at height h above the ground (Earth's surface) according to an example of the instant disclosure. The pictograph displays a few key relations of the Electric field (E) and Magnetic field (B) using the Half-space Earth model. The image is from "The Early-time (E1) HEMP and its impact on the US Power Grid" report, written in 2010 by Savage et al., Metatech Corporation, and provides an excellent analysis of the physical phenomena associated with the HEMP.

Figure 8:
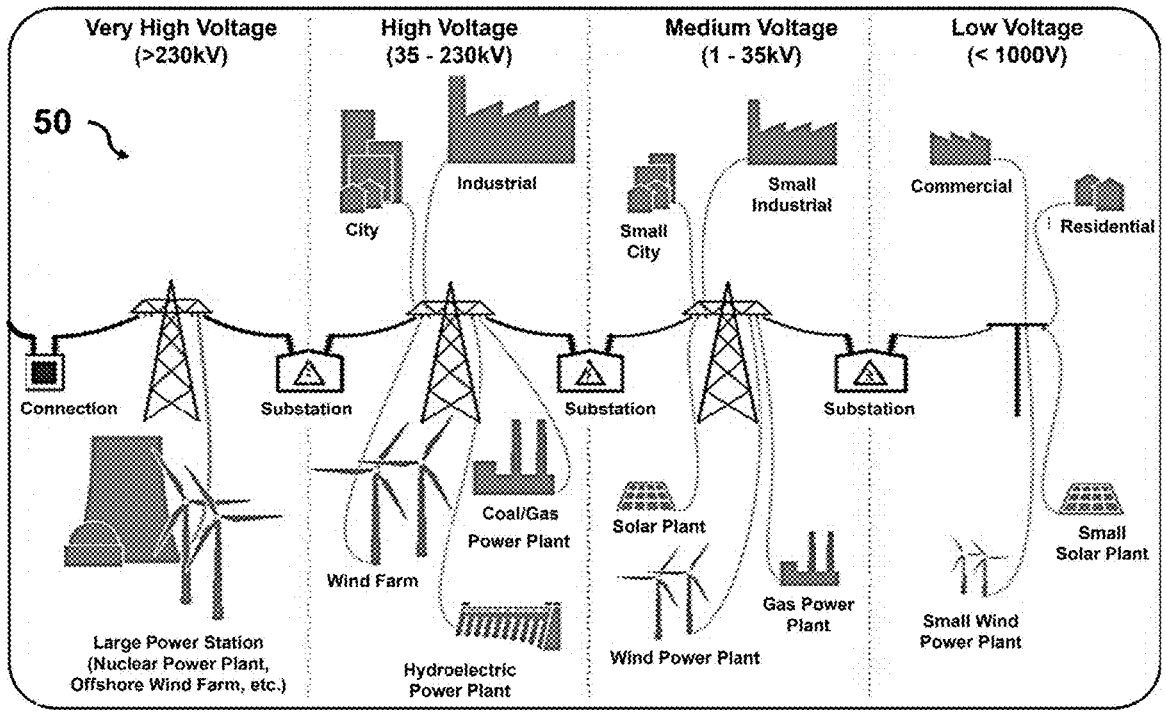
FIG. 8 displays a pictograph of an electrical power grid including very high, high, medium, and low voltage representation segments, interface substations, generation stations, and electrical loads, according to an example of the instant disclosure.

Looking to FIG. 8, pictograph 50 displays a section of electrical power grid including very high, high, medium, and low voltage representation segments, generation stations, electrical loads, and interface substations between different voltage segments. Currently, the SST technology is focused on implementation of interfacing medium voltage (MV) and low voltage (LV) segments. Compared with the current deployments with a bulky line frequency transformer (LFT), the SST-based two-level charging station, for example, becomes a potential alternative with its high-efficiency power conversion, high power density, and many other advantages. Furthermore, the modular design of SST guarantees easy scalability and redundancy implementation, as well as convenient maintenance and power expansion, which perfectly meets the need for fast integration and large-scale deployment. Methods are developed and implemented for protection of SST with focus on lightning protection of the SST MV input. The IEEE Standard C62.22 specifies the selection process to achieve acceptable coordination for LFT surge protection. The design of lightning protection for SSTs starts with reference to the LFT's design procedure and extends the protection to high altitude EMP (HEMP), according to an example of the instant disclosure.

The damage to electrical and electronic devices is determined by the amount of energy and the rate at which the energy is transferred to devices in the electromagnetic environment. All electrical or electronic equipment devices are susceptible to some level which may result in disturbance, malfunctions, or permanent damage under electromagnetic radiation of sufficient intensity. The frequency content of the waveform plays a major role in the coupling mechanism (the susceptibility and, respectively, the immunity of a system). The superimposed plots in FIG. 3 illustrate the power spectrum density distribution (V/m-Hz) associated with HEMP E1, atmospheric lightning strikes, and wideband IEMI (high-power microwave, high-intensity RF) generated from different directed energy sources.

The level of system vulnerability is dependent on the intensity of the EMF and the coupling of the external fields to the electrical circuits and the sensitivity characteristics of circuits components. A temporary malfunction (or upset) can occur when an electromagnetic field induces current(s) and voltage(s) in the operating system electronic circuits at levels that are within the rated upper limits of components' characteristics. Regardless the source of EMI, two principal radiation coupling modes are recognized in the literature and the relevant standards assessing how much radiated power is coupled into target systems: (1) "front door" coupling (FDC), and (2) "back door" coupling, (BDC). The FDC is typically observed when the power radiated from the RF/HPM source is directly coupled into the electric power and communication inputs of electronic systems. The long medium voltage (MV) and low voltage (LV) electrical transmission lines provide an efficient path for the EM energy coupling and flow from the electromagnetic environment to enter the connected equipment. As seen in superimposed plots 25 in FIG. 4, the HEMP E1 has a very broad bandwidth. While the low frequencies (long wavelengths) couple to long conductor (electrical transmission line, pipelines, etc.), the higher frequencies (shorter wavelength) couple via small apertures, making effective shielding more challenging.

The BDC occurs when the electromagnetic field from the source produces large transient voltage/currents or the EM waves propagate and couple through the gaps, small apertures, fixed electrical wiring and interconnecting cables, connections to the power mains, communication cables, network and telephone copper wires, unshielded sections, and others. The BDC can generally be described as a wide-range interference at specific narrow-band susceptibility characteristics because of existing apertures and modes of coupling to cables.

Since the impinging EMP field has a broad frequency spectrum and a high field strength, the antenna response must be considered both in and out of the antenna's band. The inadvertent, unintended, or parasitic antennae are electrically penetrating conducting structures, power lines, communication cables, and others that collect EMP energy and allow its entry into a building, a device, or an enclosure. The lines of the electrical grid can be considered as antenna pathways connected to the upstream and downstream components of the grid and are susceptible to broadband frequencies, including the lower frequency (long wavelength) coupling due to the long length of the power transmission lines. Additional factors influence the level of coupling and interference: wave polarization, geolocation, ground surface conductivity, height of the wires above ground, and others. With their long length, the electrical transmission lines are also susceptible to the E3 HEMP, as further described below.

All electrical wirings are susceptible to EMF and would couple directly to the radiated field. The exposed long transmission wires are susceptible to radiated field and without proper mitigation, the induced currents generate magnetic fields that couple to neighboring conductive lines and surfaces. Protection from radiated coupling of an EM field is achieved by shielding equipment with a conductive enclosure. In some special cases, the whole building is a shielded structure commonly known as a Faraday cage. However, this is not applicable to the long transmission MV and LV lines. Special methods are employed to lower and limit the induced transients.

A proper grounding of the electrical infrastructure is of great importance for providing passive shielding with a Faraday cage and active transient surge suppression using voltage limiting, energy absorption, and redirection. Grounding systems are well understood and used for terrestrial installations. However, the grounding of a solid-state transformer (SST) may utilize a grounding implementation to preserve the isolation between the MV and LV stages of the SST and respectively the MV and LV electrical grid segments. Respectively, protection deployments are designed to address the grounding constraints and preserve the high and low voltage stages isolation.

The term "grounding" is used in North America and accepted by Institute of Electrical and Electronics Engineers (IEEE). It is the equivalent term to "earthing", used in European Union and adapted by the International Electrotechnical Commission (IEC)—an international standards organization that prepares and publishes international standards for all electrical, electronic and related technologies. Grounding/earthing arrangements differ in the existence (whether present or not) and location of the connections of neutral-to-case (neutral-to-case bonding), of equipment-to-ground (equipment grounding), and of neutral-to-ground (system grounding). These various terms are associated with grounding/earthing and bonding.

Abbreviations of grounding systems are usually denoted by a combination of the first letters of the French words: «Terre»-ground, «Neutre»-neutral, «Isolé»-isolate, and the English words: «combined» and «separated». The use of these letters describes the grounding configuration: T—Grounding; N—Connection to neutral; I—Isolation; C—combined functions: combining the functional and protective neutral wires; and S—The separate use of functional and protective neutral wires throughout the entire grid. These designated notations are developed for the low voltage transmission and distribution lines. In terms of safety, the TN-S and TT systems are generally considered safer due to the separation of the neutral and protective earth conductors, which reduces the risk of electric shock in case of a fault. However, the safety of an electrical system depends on various factors including installation, maintenance, and compliance with regulations.

One possible way to mitigate the effects of EMP is to provide a response in real time to an event and disconnect the protected systems by isolating them physically from long cables, wires, antennas, etc. Specifically, to protect from the damaging effects of EMP, the environment must be persistently monitored with applicable sensors and when a HEMP is detected, the appropriate isolation systems must be triggered to provide protection for the infrastructure. Given the high speed of the HEMP E1 event, this is not an easy task, has major constraints, and the very limit of abruptly disconnecting current flow especially in high-power installations.

A straightforward protection method is EMI shielding and to equip the electrical and electronic systems to prevent the excessive magnitude of voltage and current from reaching the electrical load and absorb and redirect the energy of the EMP. Generally, these devices are known as surge suppressors and arrestors. Arrestors are available with a plurality of voltage ratings for the MV transmission lines. Surge protection devices (SPD) are available for LV transmission lines. Most commercially available surge suppressing devices are designed and built to offer protection to lightning with micro-seconds response times. This is not sufficient for protection from the HEMP E1 with a few nanoseconds rise time and from IEMI with variable characteristics (rise time/frequency content and repetition rate). It is important to note that localized, different capacity SPDs for LV transmission and distribution lines exist and are commercially available. Protection against transient overvoltage must be provided between live conductors and PE (common mode protection), and/or between live conductors (differential mode protection). Following up the standards specifications, the surge protection devices (SPD) are implemented as type 1, 2, and 3 with respect to the point of installation. SPDs for a split-phase 120 VAC and for three phase 277/480 VAC system are manufactured by different vendors. SPDs have different protection mode implementations and technical specifications with focus on current and energy handling capacity.

With the development of the SST technologies, multiple overvoltage surge protection methods are proposed and implemented to protect the SST. This includes coordinated arrestors and filters on the MV input side of the SST. One of the challenges for SST is the protective earthing connection of the SPD without eliminating the isolation of the MV and LV transmission grids.

Figure 9:
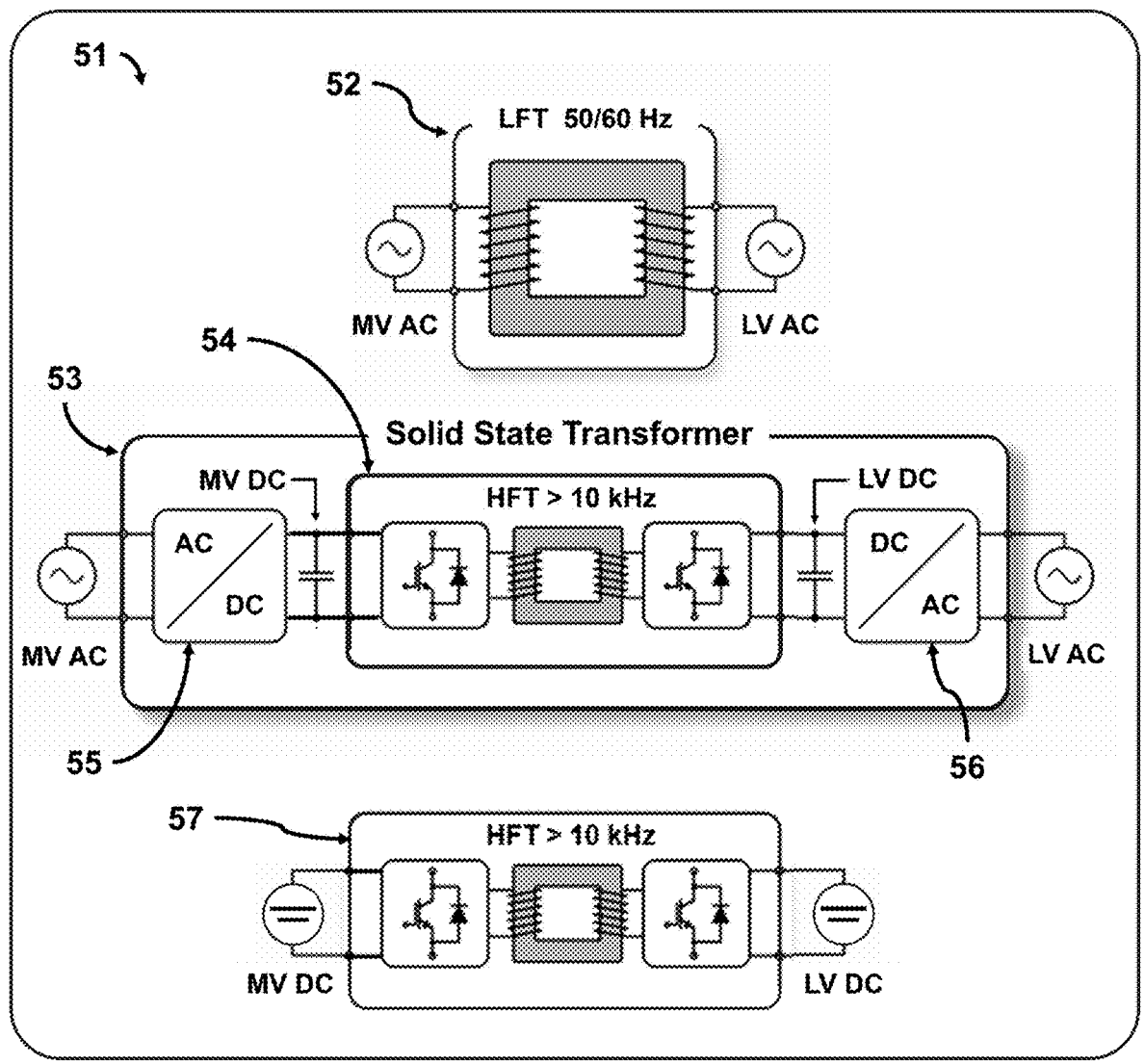
FIG. 9 illustrates the use of a standard high voltage line frequency transformer (LFT) operating at 60 or 50 Hz, interfacing a medium voltage (MV) and a low voltage (LV) electrical grid and the possible replacement of the LFT with one of four types of solid-state transformer (SST) topology configurations, according to an example of the instant disclosure.

Looking to FIG. 9, pictograph 51 displays a line frequency transformer (LFT) 52 and single AC power line solid-state transformer (SST) 53 with its main submodules providing an interface between MV AC and LV AC electrical grids. As can be seen from pictograph 51, SST 53 is a system of electronic subsystems that includes an AC/DC converter 55 at the Medium Voltage (MV) stage, which converts the AC voltage 50 or 60 Hz to DC voltage. The subsystem 54 comprises a DC/DC converter with isolation through a high frequency transformer (HFT) that operates at frequency above 10 kHz, followed by a DC/AC converter 56 at the Low Voltage (LV) stage of SST 53, to achieve isolated power transfer. The HFT considerably decreases the overall form factor of the MV/LV interface compared to the LFT 53, making its transportation, installation, and respectively replacement, when necessary, easier. For completeness, SST 57 is shown interfacing a MV DC grid segment to a LV DC grid segment. The switches of the SST's converters can be bidirectional or unidirectional for converting AC or DC, respectively.

High quality isolation may be used by the SST to reduce losses and the size of the core. A cascaded H-bridge can be usually utilized as the front-end AC/DC converter 57 of the SST. DC/DC converters, such as Dual Active Bridge (DAB), Single Active Bridge (SAB), followed by a DC/AC inverter (for example, Neutral Point Clamped inverters or similar power converters), high frequency transformer (HFT) and AC/DC converter are applied. After the AC/DC converter, different voltage DC power is available. Using DC/AC inverter 59, a low voltage (LV) AC power is available. Cascaded front-end AC/DC converters are designed to support the MV grid input in each phase with low voltage components (1-2 kV). The front-end converter 57 of each MV line relates to an isolated power transfer bridge via a DC bus capacitor. The outputs of all cascaded DC/DC converter of subsystem 58 are in parallel to effectively provide high power at the low voltage side. This general SST system configuration provides an interface between MV AC grid and LV DC or LV AC grid.

Figure 10:
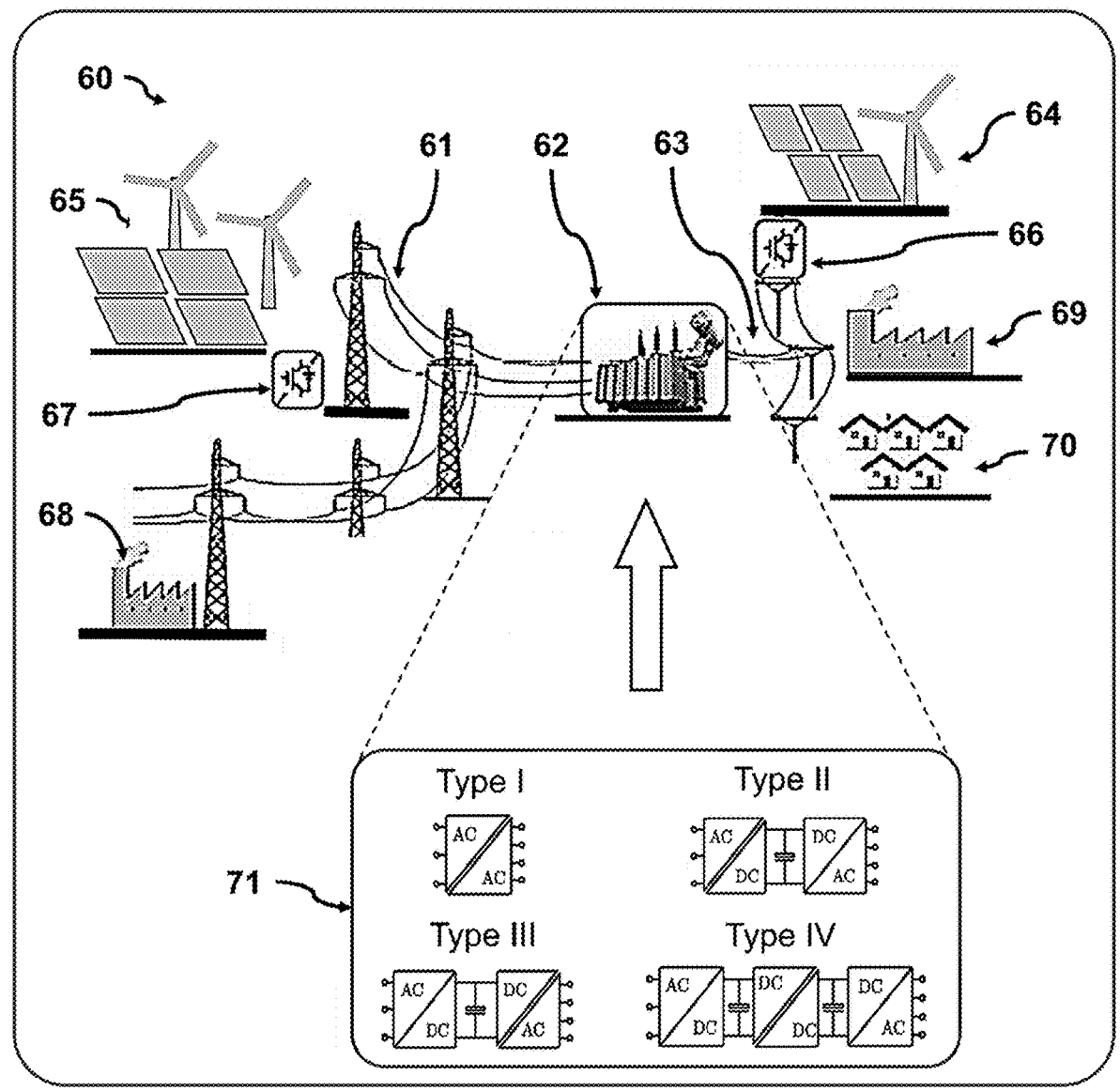
FIG. 10 presents a pictograph of medium voltage and low voltage grids interfaced with a LFT and a top-level view of the main types I-IV of SST currently developed for MV/LV electrical power grids interface, according to an example of the instant disclosure.

Looking to FIG. 10, pictograph 60 illustrates the use of a standard high voltage line frequency transformer (LFT) 62 operating at 60 or 50 Hz, interfacing a medium voltage (MV) electrical grid 61 and a low voltage (LV) electrical grid 63 and a possible replacement of the LFT with one of four types of solid-state transformer (SST) topology configurations 71. Additionally, the ability to interface alternative electrical power production with wind and solar energy 64, 65, and converters 66, 67 is illustrated. The MV utility power use 68 and LV utility power use 69 and commercial and residential users 69 is illustrated.

The SST topology configurations 71 present single-stage transformers (Type I), two-stage transformers (Type II and III), and three-stage transformers (Type IV). In a single stage transformer, high AC voltage is converted to low AC voltage with the help of an HFT. It is used to directly convert DC/DC or AC/AC. The single-stage transformer offers good efficiency and reliability due to the absence of switching losses. However, due to the high stress exerted on the power electronic switches and the DC link, it has a very complex architecture, and it does not provide sufficient power factor correction. A two-stage transformer may include a DC link on the high or low voltage side. Advantages are the bidirectional flow of power, which may use a higher number of switching components, and reactive power compensation. Two stage ST with an LV DC link is limited in application and cannot be used for high voltage operations and the lack of low voltage DC link is not suitable for applications which involve non-conventional sources. Three stage SST is developed and provides a superior performance in terms of limiting high currents, an optimal power factor improvement, and regulation of voltage. It is also suitable for use in smart grids which require bidirectional power flow.

There are many advantages of SSTs replacing standard LFT. SST offers all the functionalities of a classical transformer with additional services for the connection of DC and AC grid infrastructure components. In addition to bidirectional power flow, SSTs allow reactive power compensation, voltage regulation, reduction of voltage drops, short-circuit currents, harmonics, DC connectivity and some levels of surge protection. The major feature of an SST is its ability to integrate renewable energy sources, electric vehicles and energy storage systems into the electric power grid. By using an SST, sometimes referred to as a smart transformer (ST), instead of a conventional LFT, compensation of nonlinear currents of low voltage electrical loads is possible, thereby improving the power quality by the reduction of line current harmonics. At the same time, the SST can maintain current that is symmetrical with unity power factor irrespective of the presence of reactive power and unbalanced loads connected to LV grid. Hence the transmitted energy is only dependent upon the active power, thus reducing the losses during transmission. Various control strategies for SST can be applied depending upon the application. Also, there is improvement in voltage at the node where the SST is connected, which impacts the other integrated nodes in the grid. However, the enhanced capabilities increase the complexity and may be restricted or require power oversizing of the SST. Further description of SST advantages and design challenges are beyond the scope of this application.

Similarly to lightning strikes, operational transients may include multiple transients termed sub-transient. Magnetizing inrush current during transformer switching results in a ferro-resonance which causes the iron core to vibrate for a few seconds. Harmonic frequencies may develop expressed as $F_L = F_f + F_H$, where $F_L$ is the power line frequency, $F_f$ is the fundamental frequency of the power line, $F_H$ is the harmonic frequency (or frequencies). The terminal voltage of the power line rises with the addition of the harmonic voltage to the grid supply source voltage, and, respectively, the harmonic current is superimposed on the system normal current, culminating into switching magnetizing inrush current inducing overvoltage detrimental to transformers.

The most common faults occurring for SSTs can be classified as operational, grid related events: an internal hardware fault, switching transient, short circuit on the MV and LV stage, non-ideal load, and external to the grid, such as lightning strikes surges. The list of possible transient surges during normal operation is very long: from facility loads switching, energized line on/off and capacitor bank switching, transformers tap changing to changes caused by collapse of load voltage, short-circuit in transmission line, tree branches falling on poles/lines and flying objects bridging line conductors, loss of tie between two subsystems, power system recovery from outage, during fault clearing or interruption, high impedance earthing, and many others. In a three-phase system, faults develop in any line leads to rise in the other line voltages.

These faults are addressed in the design and implementations of LFT and SST. As an example, the system discussed herein can extend the protection of MV and LV grids to extreme transient over voltages and over currents associated with high altitude EMP and GMD. The SST is a complex electrical system and multiple different failure modes are possible, e.g., semiconductor components failures, thermal and electro-mechanical failures, control errors, sensors related errors, or insulation breakdown (particularly critical for the MV stage converter). The SSTs have some current and voltage overload capabilities, where the used semiconductors are selected to restrict the SST's overcurrent and overvoltage surges with microseconds duration transients. Given the characteristics of HEMP, to achieve a reliable overvoltage and overcurrent protection, the protection system must provide sensitive and speedy response with safe and reliable voltage and current handling capabilities including nanoseconds duration transients (HEMP E1).

The currently acceptable protection for SSTs from transient overvoltage waveforms is primarily based on arrestors and filters, which provide a smoothing effect for the surges. The breakdown voltages of the SST's power semiconductors are selected to withstand the maximum voltage that appears for voltage pulses with longer durations (waveforms surges with low frequency content), in which case filters are not sufficiently effective and are larger in size, diminishing the advantage of SSTs. For MV stage of SST, the voltage utilization of IGBTs is rated at operating conditions usually between 40% and 60% of the component ratings and the SiC and GaN FETs are used with up to 80% of the component ratings.

Figure 11:
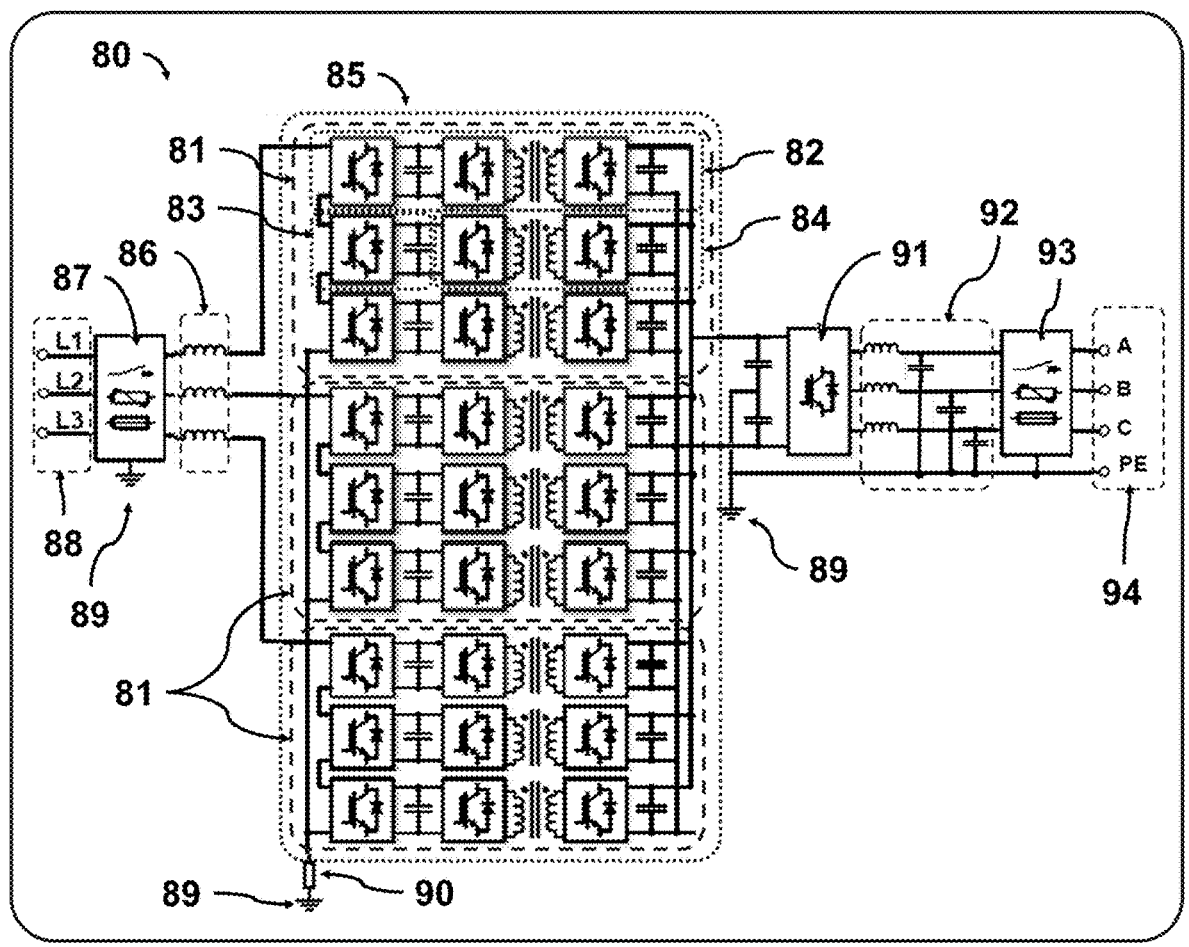
FIG. 11 displays a block diagram of a SST with a high-level view of its electrical modules and protection modules at the MV and LV stages, according to an example of the instant disclosure.

Looking to FIG. 11, a generalized diagram 80 presents SST 85 interfacing MV AC lines 88 and LV AC lines 94 grid segments. Each MV AC power line of the SST has a phase stack 81. The SST 85 example is presented with three cells stacks to simplify the diagram. Each phase stack includes multiple MV/LV converter cells 82. Each cell comprises a front-end AC/DC converter 83. The AC/DC converter of each cell is followed by a capacitor, a DC/AC inverter, a high frequency transformer (HFT), and an AC/DC converter forming a submodule 84. As previously described, the outputs of all cascaded DC/DC converters of subsystems 84 of each stack are connected in parallel to effectively provide high power at the low voltage stage of SST. DC/AC converter 91 is followed by LCL filters 92. The MV side protection is notionally presented, including line disconnectors, surge arrestors, and fuses 87, and inline inductor filters 86. In a similar manner, the LV side surge protection includes line disconnectors, surge arrestors, and fuses 93. The LV AC lines 88 of an SST has a solid ground connection 89 for safety reasons and to provide a protective earthing (PE) also called a protective earth neutral (PEN). To preserve the isolation of the MV and LV stages, a ground connection 90 with $Z_0 > 0$. This implies that the short circuit currents at the MV stage of SST are limited by the nonzero ground line impedance. This characteristic is an important consideration for the implementation of proper surge protection and will be discussed further below.

On the MV AC lines 88, only three conductors are present, allowing different choices for the earthing, e.g., solid ground ($Z_0 \to 0$), resistance grounding ($Z_0 \approx R_0$ and $R_0 > 0$), without a ground ($Z_0 \to \infty$ or delta windings), and Petersen coil ($Z_0 \approx j\omega L_0$). The earthing choice has an impact on the short fault currents and voltages during earth faults and is a trade-off between short circuit currents, damping of voltage and current transients, and over voltages but is also a grid policy which can vary between grid operators and countries. In case of a MV single-line-to-earth fault, where the effect of earthing is considered very important, the three-phase system becomes asymmetric. During such fault, the star point of an SST is shifted with respect to earth. Therefore, one or more line-to-ground voltages can exceed their nominal value. An effective earthing implementation provides low magnitude over voltages during earth fault at the cost of higher fault currents. The proper earthing is relevant to the surge protections and will be discussed further below.

Figure 12:
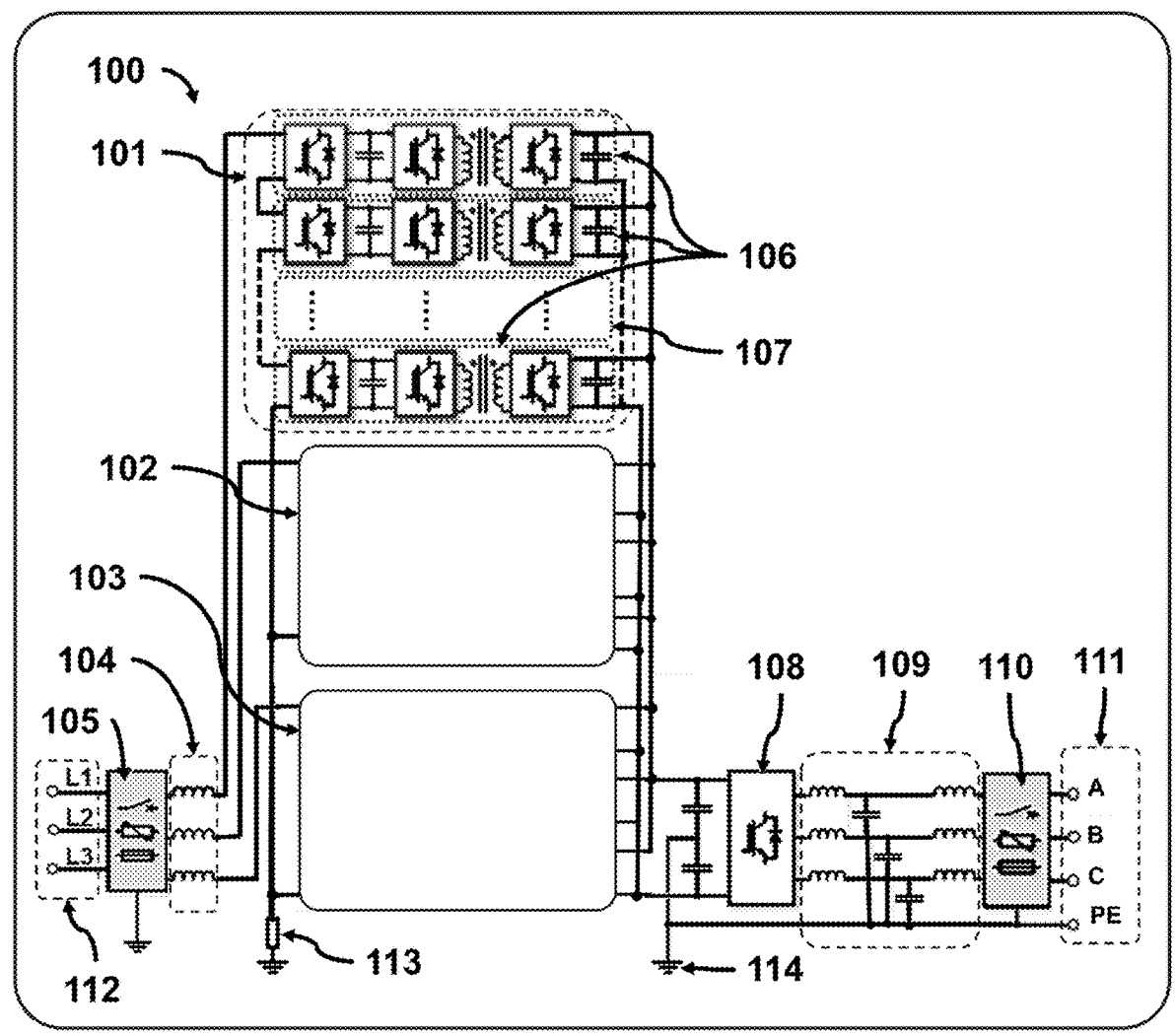
FIG. 12 displays a block diagram of the modular expansion of SST with conversion cell providing capability to interface high MV grids, according to an example of the instant disclosure.

Looking to FIG. 12, a generalized diagram 100 is presented of SST interfacing MV AC lines 112 and LV AC lines 111 electrical grid segments. The SST block diagram 100 is very similar to SST block diagram 80 in FIG. 11. It presents phase stacks 101, 102, and 103 for each one of the three MV AC lines. Each MV phase stack includes multiple MV/LV converter cells 106 and multiple identical additional converter cells 107. Each cell comprises an AC/DC converter, DC/AC inverter, high frequency transformer (HFT), and AC/DC converter. Respectively, submodules 104, 105, 108 109, and 110 have identical functionality, as described previously for FIG. 11. The grounding considerations for ground connections 113 and 114 also apply as previously discussed. Block diagram 100 presents a very important characteristic of SST-its modular design configuration. The input voltage of each converter and the number of converter cells is defined by the MV to LV conversion ratio. For example, an SST with 10 converter cells with input voltage 1.6 kV may be used to interface 16 kV MV grid to LV electrical grid segment.

Figure 13:
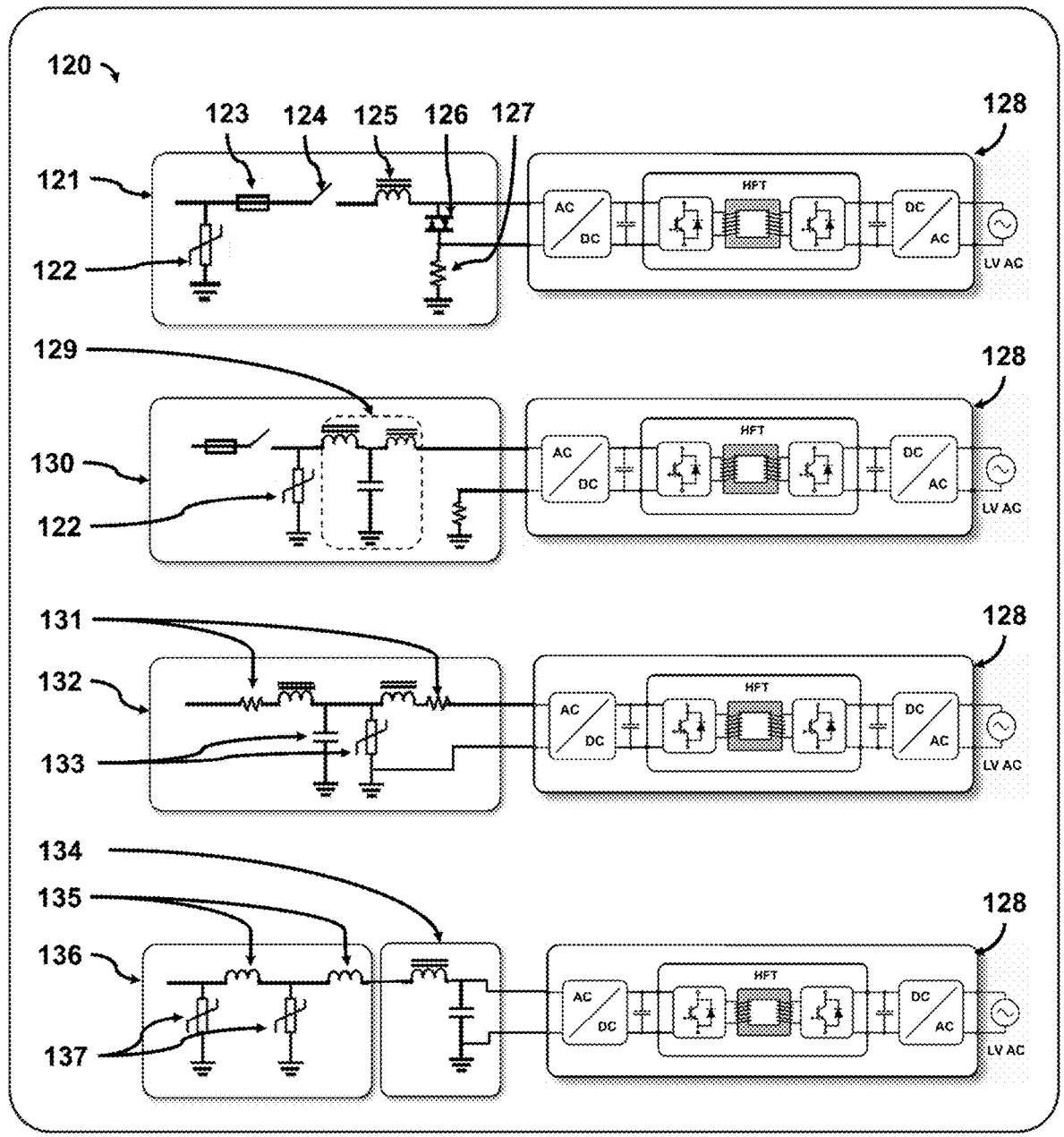
FIG. 13 displays block diagrams of protection schemes developed for the SSTs and used to protect the MV stage of SST from operational surges and lightning strikes, according to an example of the instant disclosure.

Looking to FIG. 13, block diagrams 120 present currently used MV stage protection systems 121, 130, 132, and 136. A single-phase overvoltage and overcurrent protection scheme 121 is shown. A front MOV 122 is used to attenuate the overvoltage and a fuse/breaker 123/124 combination is used to interrupt overcurrent. In addition, a purely inductive filter 125 is shown. An AC crowbar 126 with current limiting resistor 127 is added to further prevent the overcurrent from entering the front-end rectifier of the converter cells 128. The protection scheme 130 shares similar features with the addition of an LCL filter 129 after the MOV 122. Protection scheme 132 eliminates the fuse/breaker combination and uses a capacitor/MOV combination in parallel in the phase-to-ground LCL filter and two in line resistors 131 to achieve overvoltage attenuation.

Figure 14:
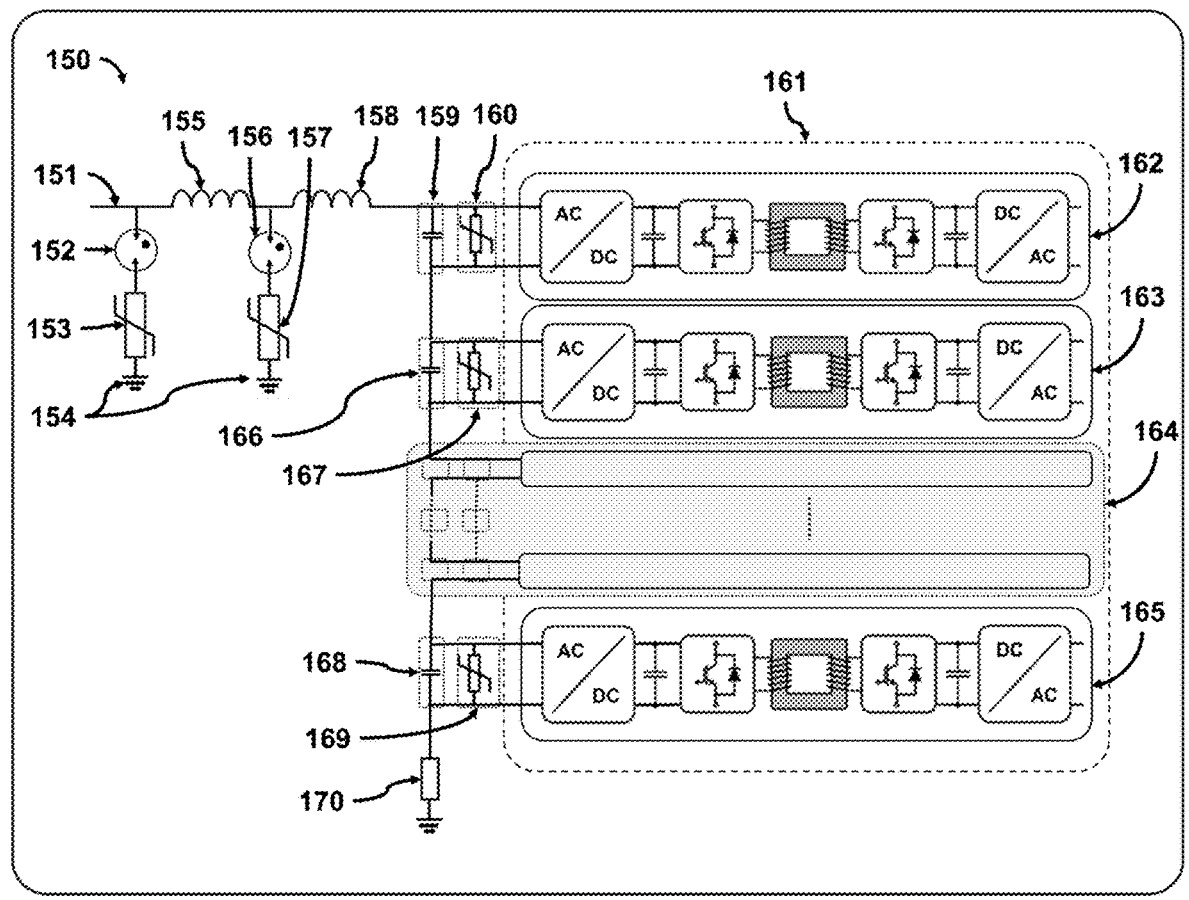
FIG. 14 presents a block diagram of enhanced protection scheme at the medium voltage inputs of converter cells of SST with coordinated gapped MOVs, according to an example of the instant disclosure.

The base voltage of per-unit (pu) values defines the peak phase-to-ground voltage as suggested by IEEE Standard C62.82.1 and can be used to evaluate the protective scheme. For example, the protective levels from a front-end MOV provide 2.5 pu to 3.5 pu. The voltage over the DC-link capacitor of the SST provides additional reduction in the magnitude of front overvoltage surge. In a three-stage SST, a differential-mode overvoltage surge could be further attenuated by stray inductances of the rectifier and the DC link capacitor and reduces the need for voltage rating of the electronic components. The addition of LC filter 134 in protection scheme 136 provides additional attenuation. Two coordinated MOVs 137 with two inductors 135 are used for differential mode surge attenuation. A second MOV further attenuates the overvoltage stress from 2.6 pu to 1.5 pu, and the air-core inductors 135 are added to take the voltage difference between two MOVs 137. The common-mode disturbances and ground level rises from HEMP E3 and Geomagnetic disturbances are not considered for any of the currently used SST because only a lightning protection is the main consideration. Also, it must be noted that the SST front-end AC/DC rectifier (converter) is solidly grounded to the reference ground potential in protection schemes 132 and 136. In comparison, protective schemes 121 and 130 use resistance grounding ($Z_0 \approx R_0$ and $R_0 > 0$), Looking to FIG. 14, block diagrams 150 present an enhanced protection scheme illustrated with a schematic installation on a single MV line 151. Inductances 155 and 158 and two coordinated metal oxide varistors (MOVs) arrestors 153 and 157 are present, as previously shown and described in FIG. 13. In this scheme, a gas discharge tube (GDT) is connected in series to the MOV forming an assembly sometimes referred to as a "gapped MOV" and utilizing the complimentary clamping capabilities of GDT and MOV. The MOV connected in series with a GDT facilitates the switching off GDT at AC voltage zero crossing on a MV AC grid segment and also on a MV DC grid segment, after the transient overvoltage surge condition. Coordinated MOV 157 has lower voltage rating than MOV arrester 153 and provides additional attenuation of surge overvoltage and isolation coordination at the MV stage of the SST. Capacitors 159, 166, and 168 are connected to the input of each one of the converter cells 162, 163, 164, and 165, respectively. In the block diagram, all converter cells are identical and block 164 indicates N-3 converter cells identical to cell 162. N is the total number of stacked converter cells forming solid-state transformer stack 161. In this regard, the nominal medium voltage line $V_{MV}$ is equal to N times the nominal input voltage $V_{CC}$ of the identical converter cells.

All converter cells have a capacitor connected at the input in parallel with an MOV. In block diagram 150, MOVs 160, 167, and 169 are shown. The same combination of a capacitor and an MOV is present at the input of all converter cells shown as a group 164. The net result is a circuit branch with capacitors from 159 to 169 connected in series and each capacitor having in parallel the stray capacitance of the MOV to which it is connected in parallel, shown as capacitor-MOV pairs 159-160, 166-167, to pair 168-169. The capacitance of bulk capacitors is larger than the stray capacitance of the MOVs, The combined capacitance with inductor 158 form an LC filter at the MV stage input of SST stack 161. The connected in series bulk capacitors from 159 to 168 also have a second role of equalizing the input voltage at each converter cell and, respectively, providing the use and proper operation of MOVs with the same voltage rating.

As previously noted, to provide isolation between MV and LV stages of an SST, each stage has a different connection to ground. Usually, the LV stage has a solid conductor to ground and the MV has a ground impedance $Z_0 > 0$. While the protection scheme presented with block diagram 150 provides enhanced capability, one main disadvantage is that all discharge current through MOVs passes to ground through impedance 170 elevating the voltage at the grounding impedance during the overvoltage surge condition. This disadvantage is mitigated with the protection scheme presented next.

Figure 15:
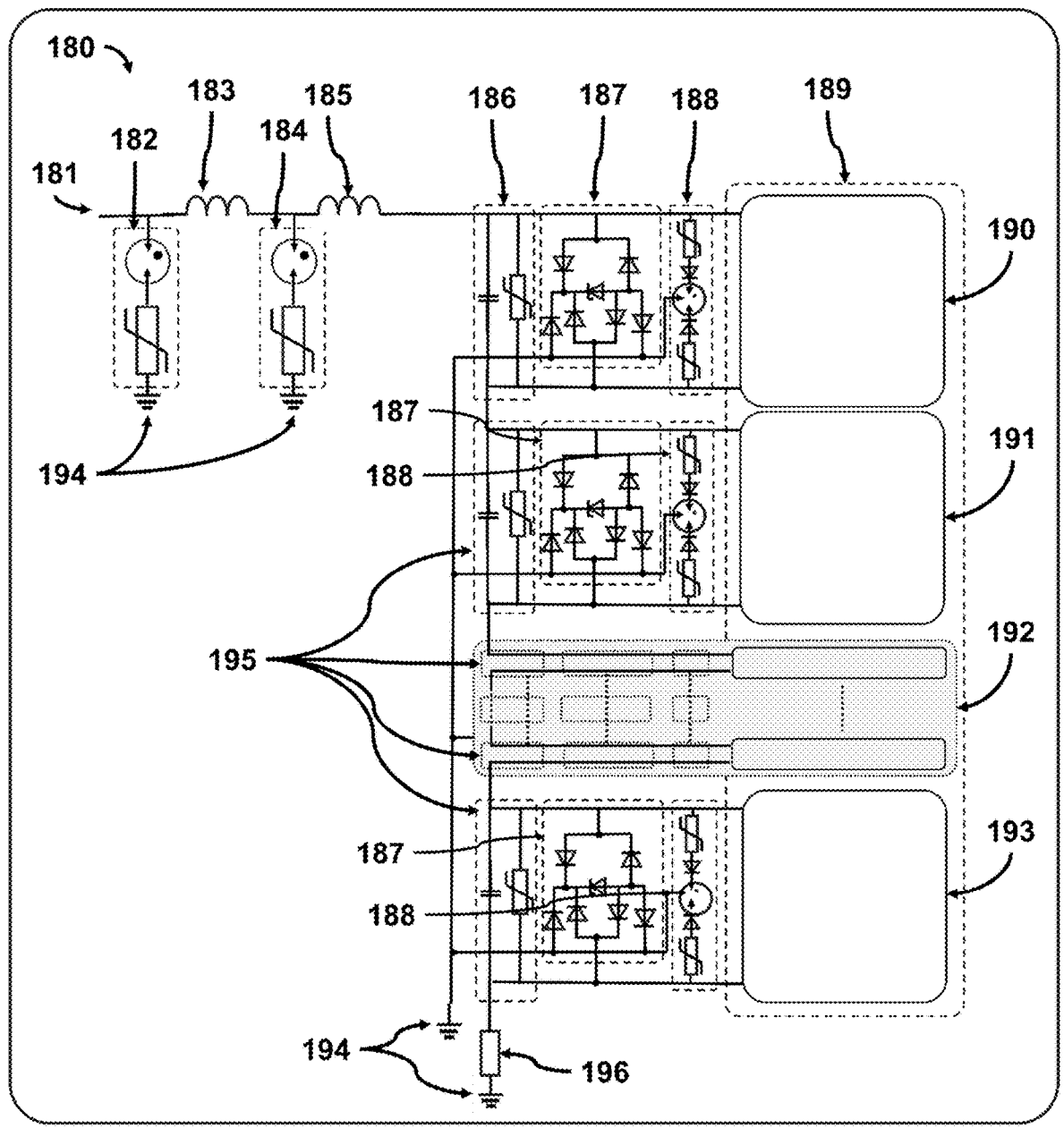
FIG. 15 presents a block diagram of comprehensive protection of MV stage of SST including protection against the high altitude EMP (HEMP), according to an example of the instant disclosure.

Looking to FIG. 15, block diagram 180 presents a protection scheme at the input of a SST 189 with many subcircuits and components presented and described previously. At MV line 181 two coordinated gapped MOVs 182 and 184 are present separated by an inductor 183. The pairs of a capacitor and an MOV in parallel (C-MOV) at the input of each converter cell is also present 186 for the first converter cell 190 and for the rest N-1 C-MOV pairs 195 of the remaining converter cells 191 to 193, respectively. Again, block 192 represents N-3 converter cells identical to cell 190. All converter cells form SST 189. Inductor 185 and C-MOV pairs form an LC filter at the MV stage input of SST 189. The coordinated gapped MOVs 182 and 184 discharge current via solid ground connection 194. The MOVs at the input of the converter cells of SST 189 discharge current via a ground connection impedance 196 with $Z_0 > 0$.

The new element in this protection scheme is the introduction of subcircuit protection assemblies (SPA) 187 and 188. An example of SPA 187 is given, comprising a transient voltage suppression (TVS) diode in combination with six high voltage diodes. The components have a voltage rating according to the input nominal voltage of the converter cell of the SST. The bulk semiconductor components may be based on different technologies. For example, the TVS diode may be an avalanche Si diode or a stack of diodes. Importantly, as shown with this example, the combination of the TVS diode with the other six diodes provides voltage clamping of overvoltage at the converter cell input and surge current discharges directly to a solid earth ground 194.

The use of a three-electrodes gas discharge tube (3eGDT) in series with two MOVs and diodes connected in series at each end-electrode of the 3eGDT form the subcircuit 188. The center electrode of the 3eGDT provides a way to discharge the transient surge current directly to ground 194 via a solid conductor without impeding the utilization of impedance 196 to provide the isolation of the MV and LV stages of the SST 189. Utilization of two separate GDTs instead of a 3eGDT is also an option as well as other circuits implementations with components networks that depend on specific applications and SST's front-end configurations. The utilization of component groups forming transient subassemblies with different characteristics with respect to coordinated clamping voltage level, response time to surge overvoltage, and current handling capacity of the surge overcurrent, comprise a coordinated hybrid surge protection (CHSP) from transient over voltages at the MV stage of the SST.

Figure 16:
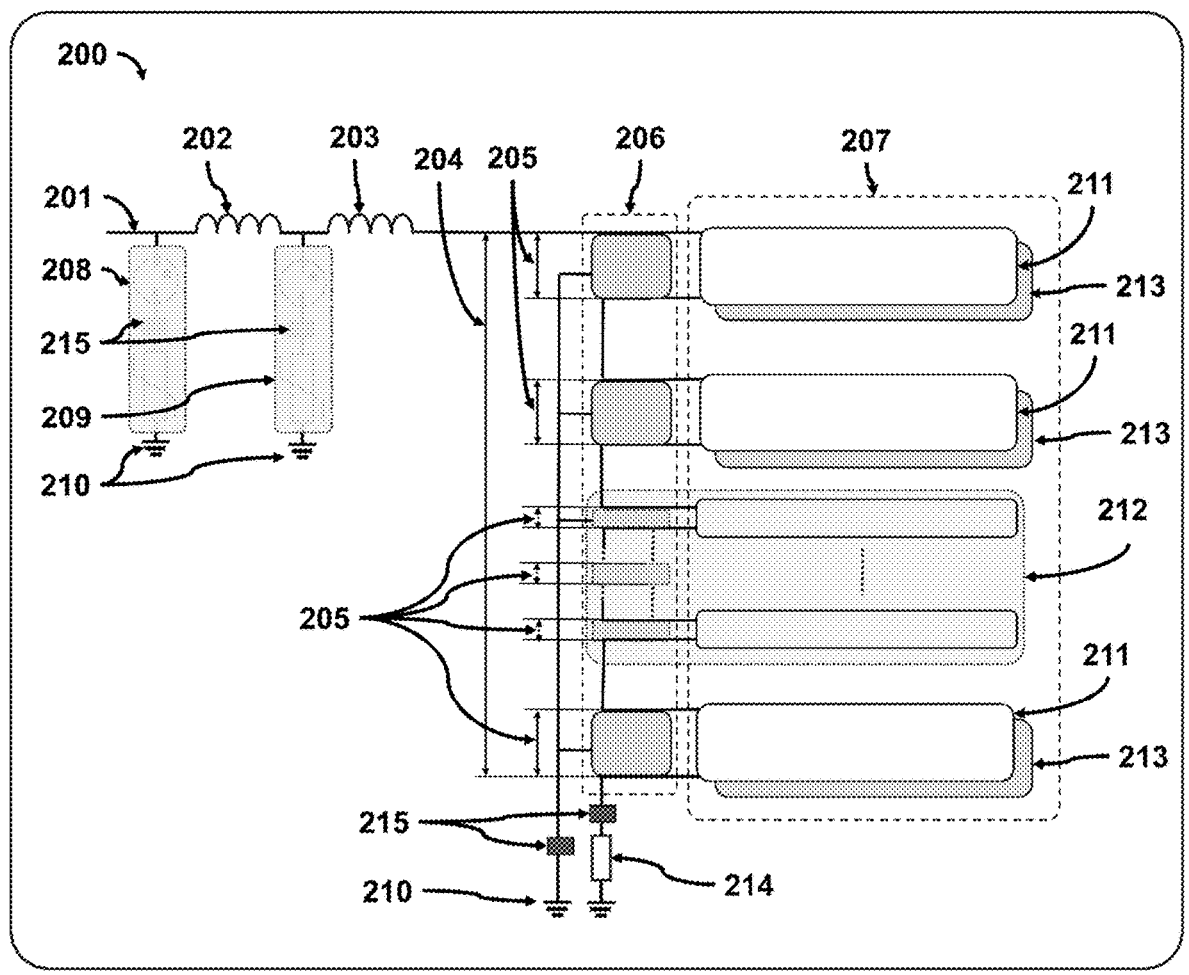
FIG. 16 presents a block diagram illustrating how the modular structure of SST is utilized to provide surge protection of MV stage with low voltage components, according to an example of the instant disclosure.

Looking to FIG. 16, block diagram 200 presents an example that is a summary of transient surge protection of medium voltage stage (MV) of SST (AC grid under 36 kV) using low voltage components in different circuit subassemblies (for example, max voltage rating less than 2 kV). The protection systems comprise coordinated hybrid surge protection (CHSP) assemblies, as previously described. Block diagram 200 illustrates protection scheme of a single MV line 201. Coordinated gapped MOVs 208 and 209 are separated with inductor 202. Inductor 203 and capacitors at the input of SST converter cells form an LC filter, as previously described. Converter cells 211 and a group of identical converter cells 212 form an SST 207 with N identical cells. The CHSP 206 is at the input of each converter cell of SST 207. The input voltage of each converter cell is $V_{CC}$. The capacitors at the converter inputs, connected in series, additionally help to equalize the input voltages of converter cells. With N=10 converter cells, the MV grid with $V_{MV} = N(V_{CC})$ voltage may be interfaced with a LV grid segment, where $V_{MV}$ is the nominal MV, $V_{CC}$ is the nominal voltage of SST converter cell, and N is the number of cells.

The block diagram of SST 207 illustrates another important component of SST design configuration—the implementation of a redundancy with capability to disconnect damaged converter cell 211 and connect a backup converter cell 213. Not all SST configuration designs may implement this feature, and different implementations are possible. With respect to transient surge protection, this inherent capability of SST designs over beneficial overall robustness. The current disclosure expands on this redundancy providing redundancy and robust EMP surge protection. With the incorporation of voltage and current sensors 215 connected and communicating with the embedded control subsystem of the SST, the capability to disconnect and connect converter cells may be used to mitigate the hazardous effect of HEMP E3 and GMD induced over currents.

Figure 17:
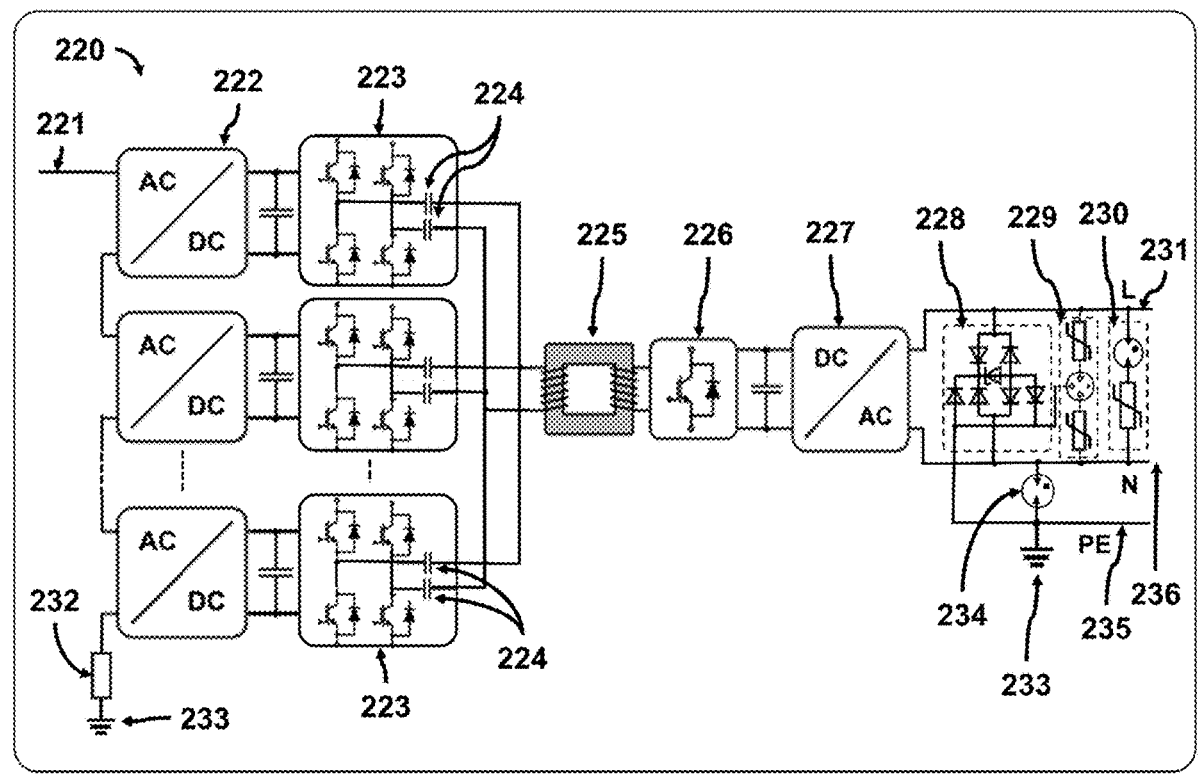
FIG. 17 presents a block diagram illustrating additional surge protection of MV and LV grid segments using SST topology and coordinated surge protection at LV stage, according to an example of the instant disclosure.

Looking to FIG. 17, block diagram 220 displays the use of SST topology with blocking capacitors and coordinated surge suppressing assemblies at the LV stage of the SST for limiting, absorbing, and shunting of transient surges. In block diagram 220, single MV AC line 221 is interfaced to LV grid segment using a SST with multiple converter modules comprising AC/DC full-bridge rectifier 222 and switch 223. The outputs of the switches 223 are connected in parallel through blocking capacitors 224 to the primary winding of high frequency transformer (HFT) 225. The blocking capacitors as part of the SST topology eliminate the DC bias voltages from reaching the HFT 225. They form a useful protection against the extremely low frequency (quasi-DC) HEMP E3 induced voltages on the distribution power lines. The secondary winding of HFT is connected to a high frequency AC to DC converter 226, followed by LV stage DC/AC converter 227. The surge protection modules 228, 229, and 230 have been previously described. They form a coordinated hybrid surge protection (CHSP) between the active AC line 231 and AC neutral 236. At least one GDT 234 may be used for differential surge protection between LV stage AC neutral line 236 and protective ground line 235. The MV stage of the SST can be connected to solid ground 233 with impedance 232, which is not zero and it is used to preserve the isolation between MV and LV grid segments, as previously described. The coordinated hybrid surge protection modules at the LV ac stage are rated with respect to the nominal voltage of the LV grid segment.

The methods and systems discussed herein provide solutions for protection of MV and LV grid segments using the modular topology of SST and low voltage components commercially available for LV AC and DC power lines. The coordinated hybrid surge protection (CHSP) addresses the complexity of HEMP induced overvoltage transients and the multiple surges from the natural (lightning, GMD, etc.) and technology generated EM energy surges on the MV and LV grid lines. Respectively, the surge protection extends to the connected electrical infrastructure AC or DC networks. In this disclosure, an emphasis is given on the value-added advantages provided by SSTs topologies and the ability to utilize the modular configuration to implement surge protection with low voltage components.

The methods and systems provide protection from the effects of excessive EM energy with flexibility of embedded installation and interconnection with modules of the SST. This hybrid technology approach is based on appropriate combination of technology elements to form surge protection assemblies which are embedded as encased devices. The direct connection to MV stage converter inputs and directly at the LV stage AC (or DC) lines provide instantaneous response to overvoltage surges without a delay associated with wire propagation delay and voltage drops associated with connecting wire inductance. The SST embedded overcurrent protection provides utility for enhanced distributed protection at multiple interface points of the electrical power distribution grid segments with different voltage levels. This also complements and expands the MV stage protection already developed for operational surges and lightning strikes.

With respect to small-size power distribution grid segments (mini-grid networks with green energy sources, energy storage and backup power systems, etc.), the disclosed methods and systems provide several advantages. Each coordinated hybrid surge protection embedded into the modular structure of SST has a dedicated properly sized overvoltage protection level and overcurrent capacity level. Hybrid multistage surge protection assemblies provide rapid response, enhanced current capacity, residual current monitoring, and status communication with the SST's control system. The hybrid multistage surge protection assemblies enhance the currently implemented surge protection of SST to address the transient surges produced by HEMP, intentional EMI, and coronal mass ejection induced geo-magnetic disturbance coupling to and effecting the normal operation of the long electrical power grid distribution lines. The inherent redundancy of SST modular design offers additional resilience to the transient surge protection of MV and LV grid segments. The ability to use commercially available low voltage components to protect the MV grid utilizing the SST modular topology is a major advantage.

What is claimed is:

1. A method for suppressing an electrical surge, induced by a transient electromagnetic energy disturbance, generated by a high-altitude nuclear weapon detonation (HEMP), intentional electromagnetic interference (IEMI) produced with directed energy electromagnetic warfare weapons, and naturally occurring events comprising lightning strikes, solar corona mass ejection (CME) resulting in Geomagnetic disturbance (GMD), from affecting operations of medium voltage (MV) and low voltage (LV) alternating current (AC) and direct current (DC) electrical power distribution grids and connected electrical devices, the method comprising:

responding instantaneously to an overvoltage transient surge, induced by an electromagnetic pulse and exceeding a predetermined threshold level above a normal operating voltage of a solid-state transformer (SST), using an embedded coordinated hybrid surge protection, limiting the overvoltage transient surge to a magnitude of the predetermined threshold level and shunting overcurrent to ground to protect the SST from damage;

clamping, limiting, absorbing, and shunting the overvoltage transient surge using the embedded coordinated hybrid surge protection, installed directly at an input of each converter cell of the SST, and interfacing a medium voltage electrical grid with a low voltage electrical grid, responding instantaneously to the overvoltage transient surge, when the overvoltage transient surge exceeds the predetermined threshold level above the normal operational voltage of converter cells of the SST, to limit the overvoltage transient surge to a magnitude of the predetermined threshold level, and to redirect the overcurrent to ground connection with near-zero impedance, using a voltage-coordinated hybrid surge protection with transient current capacity scaled with a current and time response rating of a medium voltage line overcurrent protection;

reacting instantaneously, by the embedded coordinated hybrid surge protection to an overvoltage exceeding a predetermined threshold level above the normal operational input voltage of a SST medium voltage stage converter cell, comprising at least one voltage clamping assembly with a response time within a nanosecond, limiting voltage to a level above a clamping threshold of at least one additional voltage clamping assembly with a response time within tens of nanoseconds and high current switching, absorbing, and shunting capacity to a solid conductor ground with near-zero impedance, the electrically connected embedded coordinated hybrid surge protection installed directly at an input of every converter cell of the SST, scaled with the normal operating voltage of the SST converter cell, and connected in parallel with at least one capacitor of a voltage-dividing capacitors network at the medium voltage stage of the SST equalizing voltage at the input of every converter cell of the SST, wherein, the normal operating voltage at the input of the SST converter cell is equal to a medium voltage line nominal operating voltage divided by a number of the stacked converter cells of each SST line, providing surge protection of the medium voltage electrical grid, using embedded coordinated hybrid surge protection comprising low voltage surge protection components.

2. The method for suppressing the electrical surge as in claim 1, further comprising inserting the electrically connected coordinated hybrid surge protection at the input of every converter cell of the SST in parallel with at least one capacitor of a voltage-dividing and input voltage equalizing capacitor network at the medium voltage stage converter cell of the SST, the capacitor network, comprising bulk capacitor components in parallel with the parasitic capacitance of the surge protection assembly components, forming a low pass filter with an inductor at the medium voltage stage input of the SST.

3. The method for suppressing the electrical surge as in claim 1, wherein the coordinated hybrid surge protection assembly at the input of every converter cell of the SST comprises staged protective assemblies having coordinated voltage thresholds, response times, and current switching and absorbing capacity, the method further comprising shunting the overcurrent to a solid conductor ground with near-zero impedance, without interfering with voltage isolation between the medium voltage stage and the low voltage stage provided by the high frequency transformer of the SST.

4. The method for suppressing the electrical surge as in claim 1, wherein coordinated hybrid surge protection at the medium voltage stage of the SST, further comprises:

blocking capacitors at an output of every direct-to-alternating current switching module of the SST converter cell and connected to a primary winding of at least one high frequency transformer (HFT) of the SST, preventing DC voltages from reaching the HFT, providing protection against extremely low frequency, quasi-DC voltages, induced in medium voltage electric power distribution lines from high altitude nuclear electromagnetic pulse and geomagnetic disturbance;

protecting a medium voltage electrical power distribution grid, the SST, and the interfaced low voltage electrical grid and connected electrical loads during a transient surge overvoltage; and providing continuity of operation during and after the transient surge overvoltage.

5. The method for suppressing the electrical surge as in claim 1, further comprising communicating by status monitoring sensors with a control module of the SST for real time adjustment of SST operational parameters.

6. The method for suppressing the electrical surge as in claim 1, further comprising preventing and limiting mutual operational degradation to provide mutually scaled voltage, response time, and current handling capacity when clamping, absorbing, switching, shunting overvoltage and overcurrent at input of the medium voltage stage of the SST, and, disconnecting, and reconnecting the converter cells of the SST.

7. The method for suppressing the electrical surge as in claim 1, further comprising installing embedded coordinated hybrid surge protection at a low voltage stage output of the SST enhancing the surge protection of the SST and low voltage electric grid.

8. The method for suppressing the electrical surge as in claim 5, further comprising installing embedded coordinated hybrid surge protection on additional converter cells, present in SSTs with reconfigurable topologies for redundancy, providing robustness and continuity of operation, and enhancing the surge protection of the SST, the medium voltage electric grid and the low voltage electric grid segments interfaced by the SST.

9. The method for suppressing the electrical surge as in claim 1, further comprising installing embedded surge protection as a subcircuit of a resonance network circuit of the converter cells, present in SST with resonance circuit topologies, limiting propagation of transient surges across a high frequency transformer and enhancing the surge protection of the SST, the medium voltage electric grid and the low voltage electric grid segments interfaced by the SST.

10. The method for suppressing the electrical surge as in claim 1, wherein the surge protection includes a plurality of low voltage limiting, absorbing, switching, and shunting components, additional disconnecting and reconnecting devices, and embedded coordinated hybrid surge protection with at least one assembly comprising avalanche diodes and transistors, metal oxide varistors, gas discharge and glass gas discharge tubes, spark gap protectors, and ionization discharge devices, wide-bandgap compound semiconductor components installed at every converter cell of the SST, scalable for voltage, current, and energy handling capacity proportional to the input voltage of the SST converter cells and providing protection of the medium voltage grid, equal to a converter cell input voltage times a number of stacked converter cells.

11. A system for suppressing an electrical surge induced by a transient electromagnetic energy disturbance comprising:

embedded coordinated hybrid surge protection assemblies responding instantaneously to an overvoltage transient surge, induced by an electromagnetic pulse and exceeding a predetermined threshold level above a normal operating voltage of a solid-state transformer (SST), limiting the overvoltage transient surge to a magnitude of the predetermined threshold level and shunting overcurrent, the transient surge suppressing assemblies comprising at least one subcircuit network of bulk semiconductor components providing overcurrent shunting to solid ground with near-zero impedance without interfering with isolation between a medium voltage stage and a low voltage stage of the SST;

embedded coordinated hybrid transient surge protection assemblies comprising a plurality of low voltage limiting, absorbing, switching, shunting, disconnecting, and reconnecting devices, comprising at least one subcircuit of nonlinear components and semiconductors, avalanche diodes and transistors, metal oxide varistors, gas discharge and glass gas discharge tubes, spark gap protectors, and ionization discharge devices, wide-bandgap compound semiconductor components installed at every converter cell of a plurality of converter cells of the SST, scalable for voltage, current, and energy handling capacity of a medium voltage stage converter cell;

embedded transient surge suppressing assembly of blocking capacitors at an output of every direct to alternating current (DC/AC) switching module of each of the SST converter cells, connected to a primary winding of a high frequency transformer (HFT) of the SST, eliminating DC voltages from reaching the HFT, providing protection against extremely low frequency, quasi-DC voltages, induced in medium voltage electric power distribution lines from high altitude nuclear electromagnetic pulse and geomagnetic disturbance, the embedded transient surge suppressing assembly installed as a subcircuit of resonance network circuit of the converter cells with resonance subcircuit topology SST, limiting the propagation of transient surges across the high frequency transformer and enhancing surge protection of the SST, and, respectively, medium voltage electric power distribution grid and low voltage electric power distribution grid interfaced by the SST, wherein, electrically connected coordinated hybrid transient surge protection assemblies at an input of every converter cell at a medium voltage stage converter cell of the SST, comprise low voltage components transient surge suppressing assemblies, rated accordingly to an operational input voltage of the converter cells of the SST, having an operational voltage equal to medium voltage divided by a number of converter cells connected in series at the medium voltage stage of the SST, surge protection assemblies having mutually coordinated voltage limiting levels, scaled current capacity ratings, respectively limiting mutual operational degradation when limiting, absorbing, switching, and shunting overvoltage and overcurrent at the input of every converter cell at a medium voltage stage of the SST.

12. The system for suppressing the electrical surge induced by the transient electromagnetic energy disturbance as in claim 11, further comprising embedded coordinated hybrid surge protection installed at the low voltage stage of the SST, enhancing the surge protection of the SST and the low voltage electric power distribution grid.

13. The system for suppressing the electrical surge induced by the transient electromagnetic energy disturbance as in claim 11, further comprising embedded surge protection assemblies, comprising a subsystem for monitoring SST converter cells status condition, respectively disconnecting converter cells and connecting redundant converter cells of the protected SST with redundant modular topology, enhancing the surge protection and robustness of the SST and the medium voltage grid and low voltage grid segments interfaced by the SST.

14. The system for suppressing the electrical surge induced by the transient electromagnetic energy disturbance as in claim 11, further comprising embedded surge protection assemblies of low voltage limiting, absorbing, switching, and shunting components, with at least one assembly comprising avalanche diodes and transistors, metal oxide varistors, gas discharge and glass gas discharge tubes, spark gap protectors, and ionization discharge devices, wide-bandgap compound semiconductor components installed at every converter cell of the SST, scalable for voltage with the medium voltage grid and a number of modular converter cells of an SST line stack.

15. The system for suppressing the electrical surge induced by the transient electromagnetic energy disturbance as in claim 11, further comprising embedded surge protection assemblies installed at every converter cell of the SST in parallel with at least one capacitor of a medium voltage divider network circuit, comprising bulk capacitor components in parallel with the parasitic capacitance of the surge protection assembly components, which further equalizes input voltage of the plurality of converter cells of the SST and forming a low-pass filter at the medium voltage stage input of the SST.

16. The system for suppressing the electrical surge induced by the transient electromagnetic energy disturbance as in claim 11, further comprising embedded coordinated surge protection assemblies compatible for use with bidirectional SST topologies.

17. The system for suppressing the electrical surge induced by the transient electromagnetic energy disturbance as in claim 11, further comprising embedded coordinated surge protection assemblies installed at every converter cell of the SST, shunting the overcurrent to a near-zero impedance solid conductor ground, separate from isolation ground of the medium voltage stage converter cell of the SST, a surge protection grounding connection to solid ground not interfering with voltage isolation of medium voltage grid and low voltage grid segments interfaced with the SST.

18. The system for suppressing the electrical surge induced by the transient electromagnetic energy disturbance as in claim 13, further comprising embedded coordinated surge protection assemblies, comprising a subsystem for monitoring the converter cells protection assemblies associated with an SST status and interfaced with a control subsystem of the SST for local control and remote communication.

19. The system for suppressing the electrical surge induced by a transient electromagnetic energy disturbance as in claim 11, further comprising embedded voltage limiting and current shunting protection in parallel with isolation non-zero ground impedance of the medium voltage stage stacked converter cells of the SST.

20. The system for suppressing the electrical surge induced by a transient electromagnetic energy disturbance as in claim 11, further to protect an SST interfacing two electrical grid segments at an entrance point or inside of an electromagnetically shield environment, to provide isolation electric power ground, power flow quality control, transient surge suppression, and block magnetohydrodynamic induced current from entering an electrical network of the electromagnetically shield environment.

21. A system for suppressing an electrical surge induced by a transient electromagnetic energy disturbance on medium voltage and low voltage electric power grid line segments interfaced with a solid-state transformer (SST) comprising:

embedded coordinated hybrid surge protection assemblies, responding instantaneously to an overvoltage induced by an electromagnetic pulse and exceeding a predetermined threshold level above a normal operating voltage of a solid-state transformer (SST), limiting overvoltage to a magnitude of the predetermined threshold level and shunting overcurrent, protecting the SST and grid segments interfaced by the SST without interfering with voltage isolation between an interfaced segment;

embedded coordinated hybrid surge protection assemblies, comprising low voltage components installed on every converter cell of a modular multicell SST, interfacing and isolating a medium voltage electric power grid and a low voltage electric power grid, and installed on at least one converter cell of an SST with application specific topology, interfacing and isolating two low voltage electric power grid segments;

an SST with embedded coordinated hybrid surge protection, connected in series with at least one additional SST with coordinated hybrid embedded surge protection, providing sequential coordinated voltage conversion with intermediate high voltage stage, enhancing robustness of surge protection and voltage isolation of medium voltage electric power grid segments and low voltage electric power grid segments; and an SST with embedded coordinated hybrid surge protection, connected in parallel with at least one additional SST with coordinated hybrid embedded surge protection and synchronized control, providing enhanced power conversion, redundancy of the surge protection, grid interfacing, and voltage isolation of the medium voltage electric power grid segments and the low voltage electric power grid segments, wherein, the SST with embedded coordinated hybrid surge protection, electrically connected in series or in parallel, interfacing medium and low voltage grid segments, provides resourceful protection against damaging effects of overvoltage and overcurrent surges, induced by a transient electromagnetic energy disturbance, responds instantaneously to limit the overvoltage and shunt the overcurrent, and provides EMP protection of the medium voltage electric power grid and the low voltage electric power grid.

* * * * *